US011623820B2

(12) United States Patent
DeWitt

(10) Patent No.: US 11,623,820 B2
(45) Date of Patent: Apr. 11, 2023

(54) METHOD AND APPARATUS FOR STORING OR RETRIEVING ITEMS

(71) Applicant: Opex Corporation, Moorestown, NJ (US)

(72) Inventor: Robert R. DeWitt, Marlton, NJ (US)

(73) Assignee: OPEX Corporation, Moorestown, NJ (US)

( * ) Notice: Subject to any disclaimer, the term of this patent is extended or adjusted under 35 U.S.C. 154(b) by 117 days.

(21) Appl. No.: 17/186,214

(22) Filed: Feb. 26, 2021

(65) Prior Publication Data
US 2021/0354918 A1 Nov. 18, 2021

Related U.S. Application Data

(63) Continuation of application No. 16/665,849, filed on Oct. 28, 2019, now Pat. No. 10,947,044, which is a continuation of application No. 15/784,580, filed on Oct. 16, 2017, now Pat. No. 10,457,483, which is a continuation of application No. PCT/US2016/028500, filed on Apr. 20, 2016.

(60) Provisional application No. 62/150,786, filed on Apr. 21, 2015.

(51) Int. Cl.
B65G 1/04 (2006.01)
B65G 1/06 (2006.01)
B65G 1/137 (2006.01)
B07C 3/08 (2006.01)

(52) U.S. Cl.
CPC ............ *B65G 1/0492* (2013.01); *B07C 3/087* (2013.01); *B65G 1/04* (2013.01); *B65G 1/0485* (2013.01); *B65G 1/06* (2013.01); *B65G 1/065* (2013.01); *B65G 1/137* (2013.01); *B65G 1/1373* (2013.01)

(58) Field of Classification Search
CPC .... B65G 1/0492; B65G 1/065; B65G 1/0485; B65G 1/06; B65G 1/1373; B65G 1/04; B65G 1/137; B07C 3/087
See application file for complete search history.

(56) References Cited

U.S. PATENT DOCUMENTS

| 5,018,926 A | 5/1991 | Sternad | |
| 7,861,844 B2* | 1/2011 | Hayduchok | B07C 7/005 198/370.1 |
| 9,334,116 B2* | 5/2016 | DeWitt | B65G 1/0492 |

(Continued)

FOREIGN PATENT DOCUMENTS

| AU | 2021200477 | 3/2022 |
| DE | 2114705 | 10/1971 |

(Continued)

OTHER PUBLICATIONS

Supplemental European Search Report issued in EP Application No. 16783795 dated Dec. 10, 2018.

(Continued)

*Primary Examiner* — Thomas Randazzo
(74) *Attorney, Agent, or Firm* — Stephen Eland

(57) ABSTRACT

A method and apparatus are provided for storing and retrieving items to/from a plurality of destinations areas. A storage and retrieval system stores and retrieves items as needed and transfer items from storage locations to transfer locations. A separate picking system conveys the items from the transfer locations to a picking station or an input out station so that the item can be selected.

10 Claims, 10 Drawing Sheets

(56) References Cited

U.S. PATENT DOCUMENTS

| | | | |
|---|---|---|---|
| 10,071,857 B2* | 9/2018 | DeWitt | B65G 1/137 |
| 10,947,044 B2 | 3/2021 | DeWitt | |
| 2004/0238326 A1* | 12/2004 | Lichti | B65G 47/57 |
| | | | 198/475.1 |
| 2008/0277243 A1* | 11/2008 | Hayduchok | B07C 3/087 |
| | | | 198/463.6 |
| 2010/0076591 A1 | 3/2010 | Lert | |
| 2014/0031972 A1* | 1/2014 | DeWitt | B65G 1/04 |
| | | | 700/214 |
| 2014/0088758 A1 | 3/2014 | Lert | |
| 2014/0124332 A1* | 5/2014 | Hayduchok | B65G 1/04 |
| | | | 198/347.2 |
| 2014/0271063 A1* | 9/2014 | Lert | B65G 1/1373 |
| | | | 700/218 |
| 2014/0288696 A1 | 9/2014 | Lert | |
| 2017/0029212 A1* | 2/2017 | Huiskamp | B65G 1/1378 |

FOREIGN PATENT DOCUMENTS

| | | |
|---|---|---|
| DE | 10 2011 014 394 | 9/2012 |
| GB | 1333745 | 10/1973 |
| JP | 2004123350 | 4/2004 |
| JP | 2016175711 | 10/2016 |
| JP | 2021006779 | 1/2021 |
| WO | 2011032654 | 3/2011 |
| WO | 2012106744 | 8/2012 |
| WO | 2015007514 | 1/2015 |

OTHER PUBLICATIONS

Search Report issued in Singapore Application No. 11201708640U dated Jul. 16, 2018.
Written Opinion issued in Singapore Application No. 11201708640U dated Jul. 16, 2018.
International Preliminary Report for PCT/US2016/028500 dated Oct. 24, 2017.
Search Report issued in Japan Application No. 2021-006779 dated Nov. 12, 2021.
Examination Report from Australia Application No. 2021200477 dated Mar. 29, 2021.
Examination Report issued in New Zealand for Application No. 773964 dated Jan. 13, 2023.

* cited by examiner

METHOD AND APPARATUS FOR STORING OR RETRIEVING ITEMS

PRIORITY CLAIM

This application is a continuation of co-pending U.S. patent application Ser. No. 16/665,849 filed on Oct. 28, 2019 and set to issue on Mar. 16, 2021 as U.S. Pat. No. 10,947,044, which is a continuation of U.S. patent application Ser. No. 15/784,580 filed Oct. 16, 2017 issued on Oct. 29, 2019 as U.S. Pat. No. 10,457,483, which is a continuation of International Patent Application No. PCT/US2016/028500, filed Apr. 16, 2016, which claims priority to U.S. Patent Application No. 62/150,786, filed Apr. 21, 2015. The entire disclosure of each of the foregoing applications is hereby incorporated by reference herein.

FIELD OF THE INVENTION

The present invention relates to a material handling system for storing or retrieving items. More specifically, the present invention relates to a material handling system incorporating a plurality of destination areas arranged along a track for guiding a plurality of vehicles for carrying items to and/or from the destination areas.

BACKGROUND OF THE INVENTION

Storing and retrieving items can be laborious and time consuming, especially as the number of different items increases. For example, many companies have tens of thousands of different of items that need to be stored and retrieved. For instance, large manufacturing companies require accurate and timely storage of various parts for the products being manufactured as well as components used during the manufacturing process. Delays in retrieving the necessary components can delay the overall manufacturing process.

Similarly, retail companies, such as online retail companies, require fast and accurate picking of items sold to their customers to ensure that orders are timely fulfilled. Such online companies often stock tens of thousands of items that need to be readily available for shipment to customers. Systems that rely upon human effort to store and retrieve products in such situations tend to require more time to pick the required products and tend to have a higher percentage of errors (i.e. retrieval of incorrect items). Therefore, there is a growing need for automated systems designed to automatically store and retrieve items to improve the efficiency of order fulfillment.

SUMMARY OF THE INVENTION

In light of the foregoing, the present invention provides a method and apparatus for handling items. According to one aspect, the system includes a plurality of storage locations, and a plurality of delivery vehicles for delivering items to or retrieving items from the storage locations. A track guides the delivery vehicles to the storage locations. The system may also include a controller that controls the operation of the delivery vehicles based on information determined for each item to be stored. Additionally, the track may include a plurality of interconnected vertical and horizontal sections so that the vehicles may travel along a continuous path changing from a horizontal direction to a vertical direction. Further, the vehicles may be driven such that the orientation of an item on the vehicle stays constant as the vehicles changes from a horizontal direction of travel to a vertical direction of travel.

According to another aspect, the present invention provides a method for storing and retrieving items. The method includes the steps of storing a plurality of items in a plurality of storage locations and retrieving items from the storage locations. The retrieved items are conveyed to transfer locations. The method also includes controlling or driving a plurality of picking vehicle along a track. The track may have interconnected horizontal and vertical sections. The track may form a loop and the loop may be a vertically oriented loop. The step of controlling the vehicles may comprise the step of circulating the picking vehicles around a track between one or more picking stations and the transfer locations. The step of circulating the picking vehicles may include driving one of the picking vehicles to one of the transfer locations and transferring one of the retrieved items from the transfer location onto the picking vehicle. The picking vehicle may then be driven from the transfer locations to one of the picking stations. At the picking station, the picking vehicle may be stopped so that the item can be picked off the picking vehicle. After an item is picked, the picking vehicle may be advanced away from the picking station to one of the transfer locations. Optionally, the picking vehicle is controlled so that the horizontal orientation of the picking vehicle is maintained as the picking vehicle drives from the first connecting leg to the lower leg.

According to yet another aspect, the present invention provides a material handling system that includes a storage and retrieval system having a plurality of storage locations for storing items and means for storing and retrieving items operable to retrieve items from the storage locations and move the items to one or more transfer locations. The system further includes mean for picking operable to transfer items to and from transfer locations. Optionally, the means for picking may include a plurality of picking vehicles for transporting items between an input/output station and one of the transfer locations. The means for picking may also include means for controlling the vehicles so that the vehicles are driven to an area adjacent one of transfer locations to transfer items between the picking vehicle and the transfer location. The vehicles may be controlled so that the vehicles are driven to the input/output station and maintained at the input/output station to allow removal of one of the items on the picking vehicle. Optionally, each vehicle may comprise a motor for driving the means for driving the vehicle.

According to a further aspect, the present invention provides a material handling system that includes a storage and retrieval system for transferring items to a plurality of transfer locations and a separate input/output system for transferring items to and from the transfer locations. Optionally, the storage and retrieval system includes a plurality of storage locations for storing items. The storage and retrieval system may also include a plurality of independently operable displaceable storage and retrieval vehicles operable to retrieve items from the storage locations and convey the items to one or more of the transfer locations. Optionally, the input/output system includes a plurality of picking vehicles for transporting items. The input/output system may also include a picking track for guiding the picking vehicles. Optionally, the track comprises a loop. There may also be an input/output station along the track where an item can be removed from one of the delivery vehicles. Additionally, the picking vehicles may optionally circulate around the loop between the input/output station and the one or more transfer locations. Additionally, optionally the picking vehicles may be configured differently than the optional displaceable storage and retrieval vehicles. The system may control operation of the picking vehicles so that the vehicles are driven along the picking track adjacent one of transfer locations to transfer items between the picking vehicle and the transfer location.

According to yet another aspect, the present invention provides a storage and retrieval system that includes a storage and retrieval system and a picking system. The storage and retrieval system includes a plurality of storage locations for storing items and a displaceable storage and retrieval device movable between the storage locations. The displaceable storage and retrieval device is operable to retrieve items from the storage locations and move the items to one or more transfer locations. The picking system operable to transport items to and from the one or more transfer locations and includes a plurality of picking vehicles for transporting items a picking track for guiding the picking vehicles and an input/output station along the track. The input/output station is configured so that an item can be removed from one of the delivery vehicles. The picking track includes a loop and is configured so that the picking vehicles are operable to circulate around the loop between the input/output station and one or more of the transfer locations. The picking system is configured to control operation of the picking vehicles so that the vehicles are driven along the track to an area adjacent one of transfer locations to transfer items between the picking vehicle and the storage and retrieval system at the transfer location. The picking system is configured to control operation of the picking vehicles so that the picking vehicles are driven from one of the transfer locations to the input/output station to allow removal of items from the picking vehicle.

Optionally, the displaceable storage and retrieval device may be configured differently than the picking vehicles. For instance, the displaceable storage and retrieval device comprises a plurality of storage and retrieval vehicles, wherein the storage and retrieval vehicles are of a first type and the picking vehicles are of a second type that is different than the first type.

Additionally, the displaceable storage and retrieval device may comprise a plurality of storage and retrieval vehicles and the storage and retrieval system may comprise a storage and retrieval track that guides the storage and retrieval vehicles. The storage and retrieval track may be separate from the picking track. For instance, the storage and retrieval track may terminate separate from the picking track to prevent storage and retrieval vehicles from entering the picking track. In particular, the system may include a stop that impedes displacement of the storage and retrieval vehicles onto the picking track. Optionally, the stop may comprise a wall of the picking track.

According to another aspect, the storage and retrieval system may be configured to impede displacement of the displaceable storage and retrieval device into the picking track. Additionally, each picking vehicle may comprise a substantially horizontal support for supporting items in a generally horizontal orientation. Optionally, the system may include a transfer mechanism for transferring items from the storage and retrieval devices to the transfer locations. The transfer mechanism may be mounted on one of the picking vehicles.

Optionally, each transfer location may comprise two sections, a first section configured to receive items from the displaceable storage and retrieval device and a second section configured to receive items from the picking vehicles. Additionally, each transfer location may comprise a conveyor for conveying items between the first section and the second section. Further still, the storage and retrieval system may be configured so that the displaceable storage and retrieval device is operable to transfer items directly onto one of the picking vehicles.

According to a further aspect, the present invention provides a material handling system that includes a storage and retrieval system and an input/output system. The storage and retrieval system may include a plurality of storage locations for storing items and a plurality of independently operable displaceable storage and retrieval vehicles operable to retrieve items from the storage locations and convey the items to one or more transfer locations. The storage and retrieval vehicles also may be displaceable between the plurality of storage locations. The input/output system may be operable to transfer items to and from the one or more transfer locations. Additionally, the input/output system may include a plurality of picking vehicles for transporting items, a picking track for guiding the picking vehicles and an input/output station along the track. The input/output station may be configured to facilitate removal of an item from one of the delivery vehicles. Additionally, the track may include an loop and the picking vehicles may circulate around the loop between the input/output station and the one or more transfer locations. Further, the picking vehicles may be configured differently than the displaceable storage and retrieval vehicles.

BRIEF DESCRIPTION OF THE DRAWINGS

The foregoing summary and the following detailed description of the preferred embodiments of the present invention will be best understood when read in conjunction with the appended drawings, in which.

DETAILED DESCRIPTION OF THE INVENTION

Figure 1:
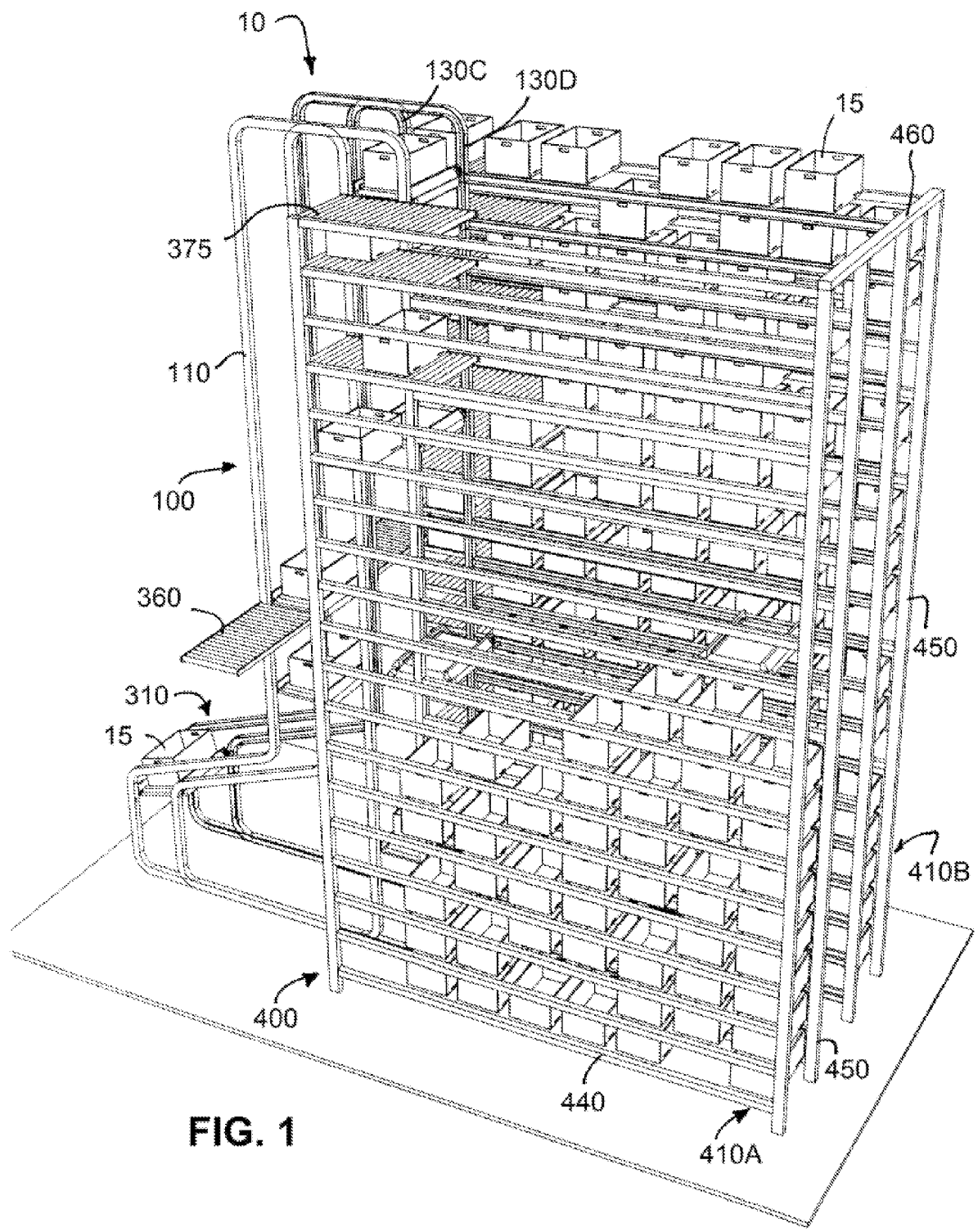
FIG. 1 is a perspective view of a storing and retrieving apparatus and numerous storage bins.

Referring now to the figures in general and to FIG. 1 specifically, a system for storing or retrieving items is designated generally 10. The system 10 includes a picking system 100 and a storage and retrieval system 400. The storage and retrieval system 400, referred to as SAR system 400, includes numerous storage locations where items are stored for retrieval. The SAR system 400 retrieves the items as needed and conveys the items to a destination area, such as transfer location 375. The picking system 100 includes a plurality of vehicles 200 that retrieve items from the transfer location and convey the items to a picking station 310 where an operator can pick the item to be included in an order for order fulfillment or otherwise. After the item is picked, the vehicle is driven away from the picking station back to a transfer location to return items to the SAR system 400 and/or retrieve further items. In this way, a plurality of picking vehicles circulate around the picking system 100 transferring items to and from transfer locations while the SAR system 400 continuously transfers items between the transfer locations and the storage locations.

In the following description, the picking system 100 and the SAR system 400 are separate systems that interact through one or more destination area, such as transfer locations 375. The particular SAR system 400 described below is simply one example of an SAR system that can be utilized to organize and systematically store and retrieve a large number of unique items that can be selected as desired.

In the embodiment illustrated in FIGS. 1-10 and described below, the system stores the various items in containers referred to as bins or totes. The containers are shown as having uniform dimensions so that each container is the same size. However, it should be understood that the system may be configured to use containers of varying size if desired. Additionally, in some applications the items may be pre-packaged so that the items are transferred directly rather than being conveyed in a separate bin or tote. Accordingly, in the following discussion, when a container or bin or tote is described as being conveyed or transferred by the picking system 100 or the SAR system 400 it should be understood that the item may be conveyed or transferred directly without using a bin or tote.

Picking System

The picking system 100 is designed so that items are retrieved from the SAR system 400 and conveyed to one or more picking stations 310 so that items can be picked to fulfill orders as needed. The picking system 100 includes a loop of track 110 and one or more picking stations 310 and one or more transfer locations 375 are positioned along the loop of track. A plurality of picking vehicles 200 circulate around the loop of track 110 to deliver items to the picking station(s) 310 and transfer items to and from the transfer location(s) 375.

The cars 200 are semi-autonomous vehicles that each have an onboard power source and an onboard motor to drive the cars along the track 110. The cars also include a loading/unloading mechanism 210, for loading items onto the cars and discharging items from the cars.

Since the system 10 includes a number of cars 200, the positioning of the cars is controlled to ensure that the different cars do not crash into each other. In one embodiment, the system 10 uses a central controller 350 that tracks the position of each car 200 and provides control signals to each car to control the progress of the cars along the track. The central controller 350 may also control operation of the various elements along the track, such as the gates 180. Alternatively, the gates may be actuated by the cars 200 as discussed further below.

Picking Track

In the present instance, the picking track 110 includes an upper rail 135 and a lower rail 140. A plurality of vertical legs 130 extend between the upper leg 135 and the lower leg 140. During transport, the cars travel up a pair of vertical legs 130A, 130B from the pick station 310 to the upper rail 135 (as described below, the cars actually travel up two pairs of rails because the track includes a forward track and a parallel opposing track). The car then travels along the upper rail and then travel down a second column formed by vertical legs 130C, 130D. In the present instance, a transfer location 375 is located at the top of the second column. Accordingly, the picking vehicle 200 may stop at the transfer location 375 and transfer a tote 15 to and/or from the transfer location.

The car then travels downwardly along vertical legs 130C, 130D optionally stopping at a transfer location positioned along the vertical legs. After transferring an item, the car travels down the vertical legs until reaching the lower horizontal leg 140. The car then follows the lower rail back toward the pick station 310.

Figure 2:
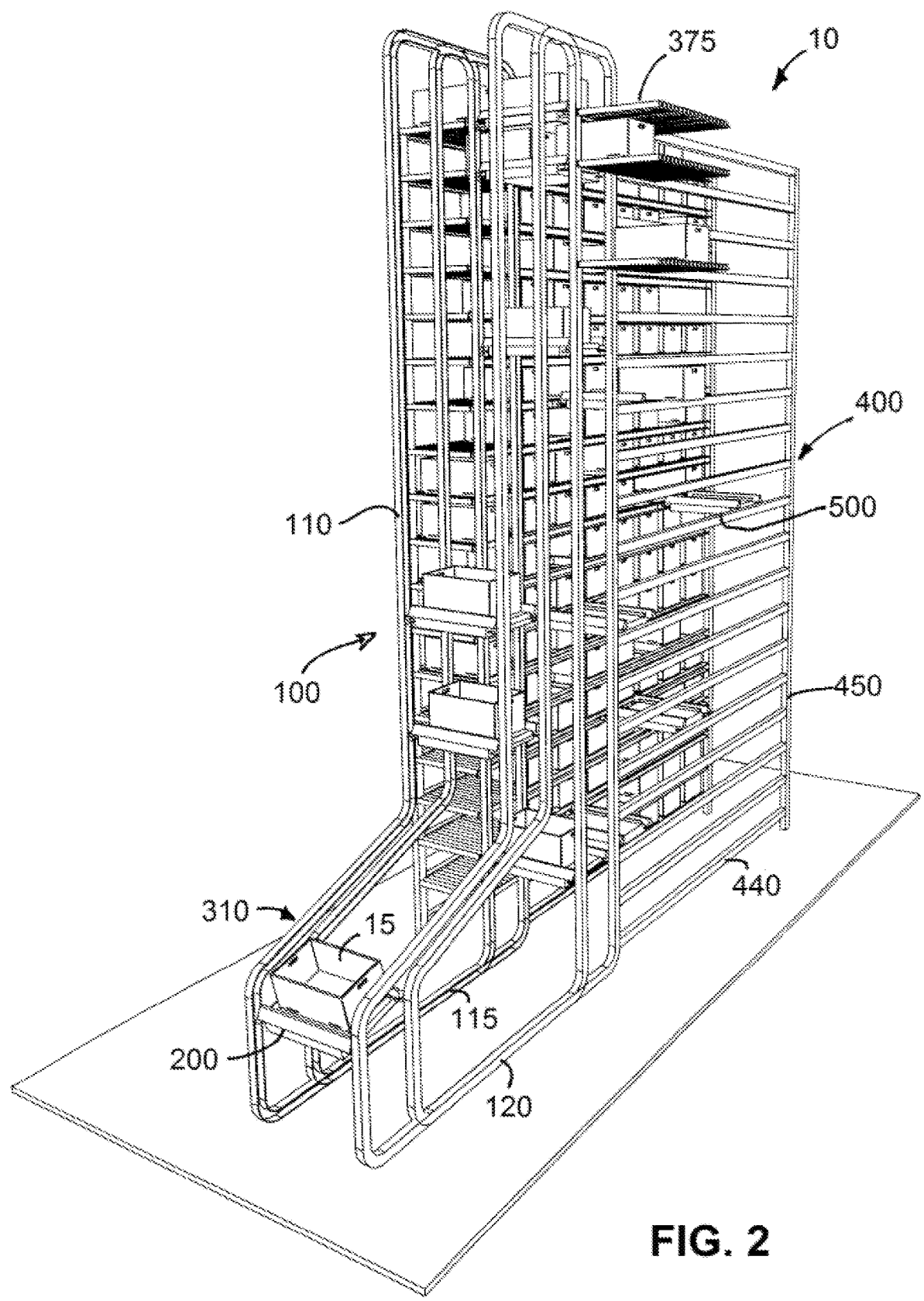
FIG. 2 is another perspective view of the apparatus shown in FIG. 1, with many of the storage bins removed.
Figure 3:
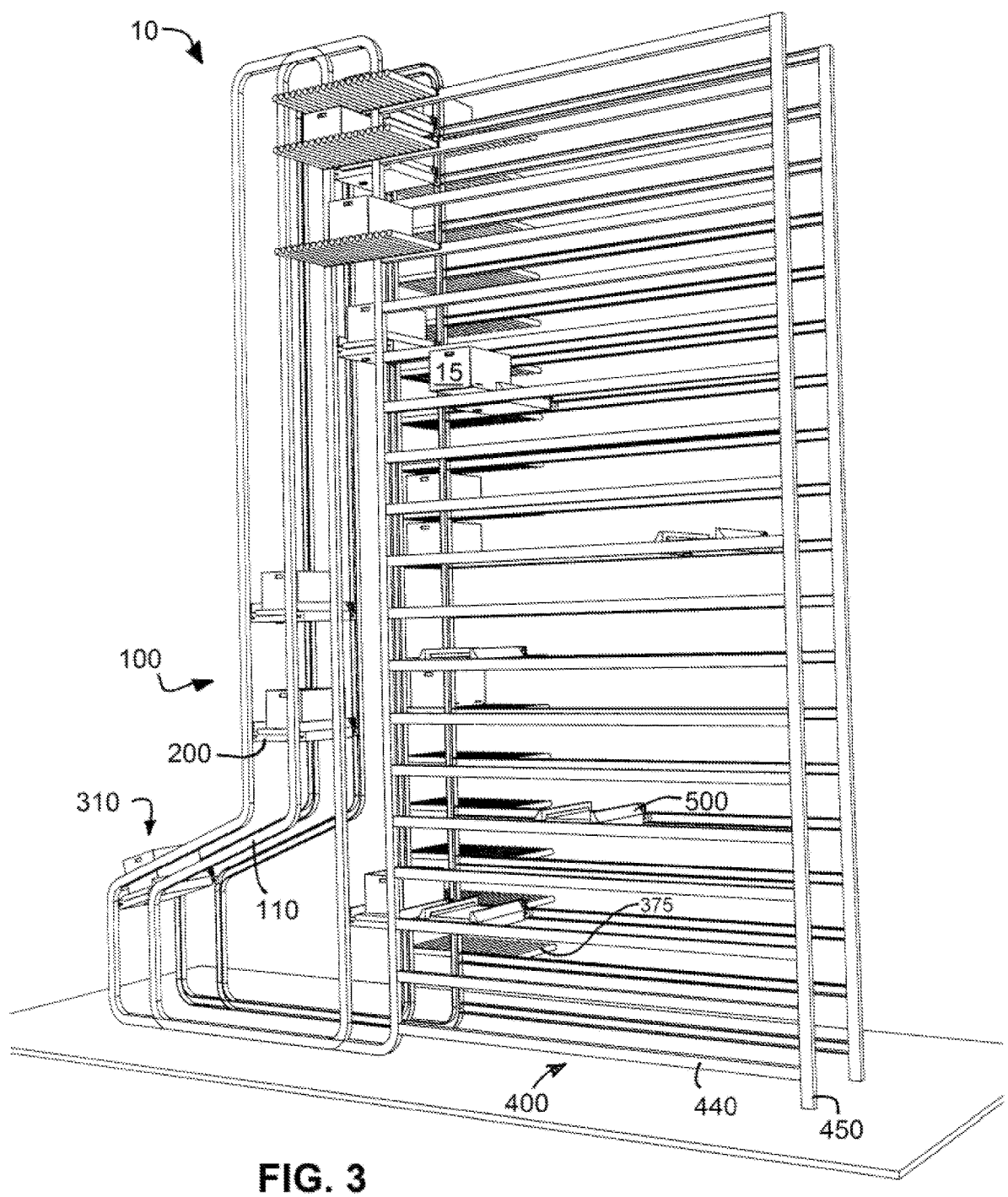
FIG. 3 is another perspective view of the apparatus shown in FIG. 1, with many of the storage bins removed.
Figure 7:
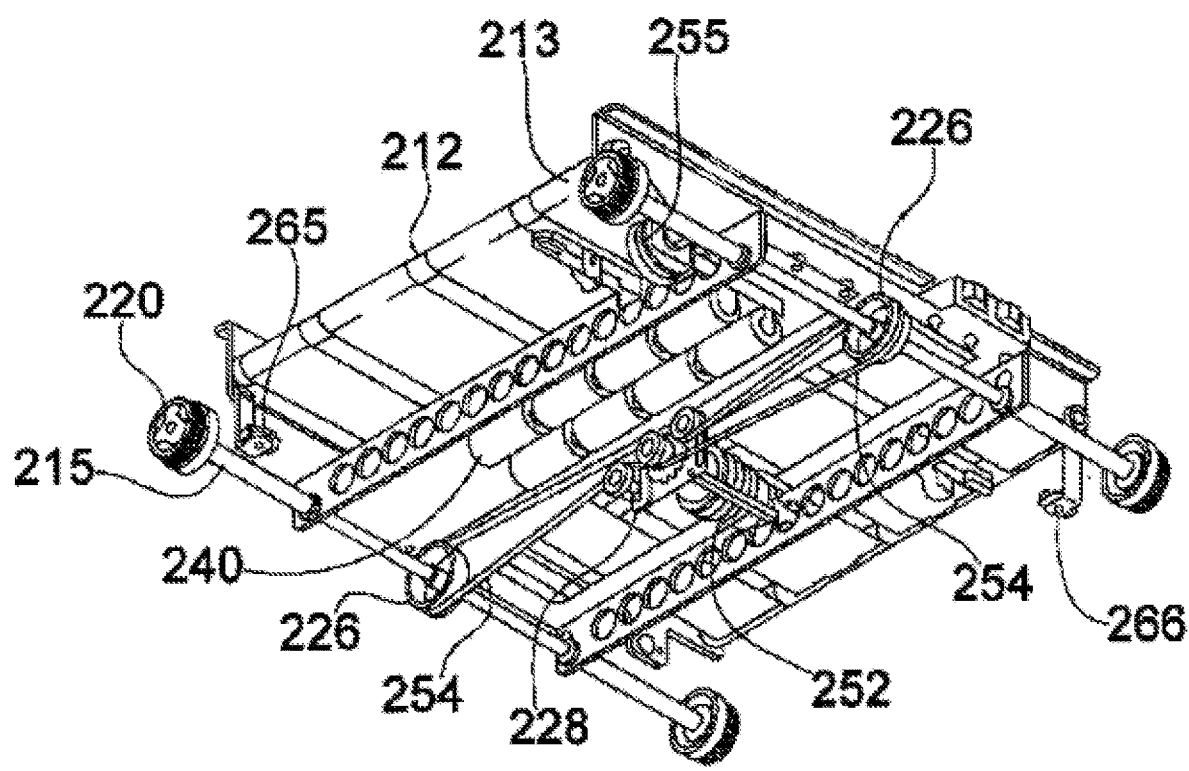
FIG. 7 is an enlarged perspective view of a vehicle of the apparatus of FIG. 1.
Figure 8:
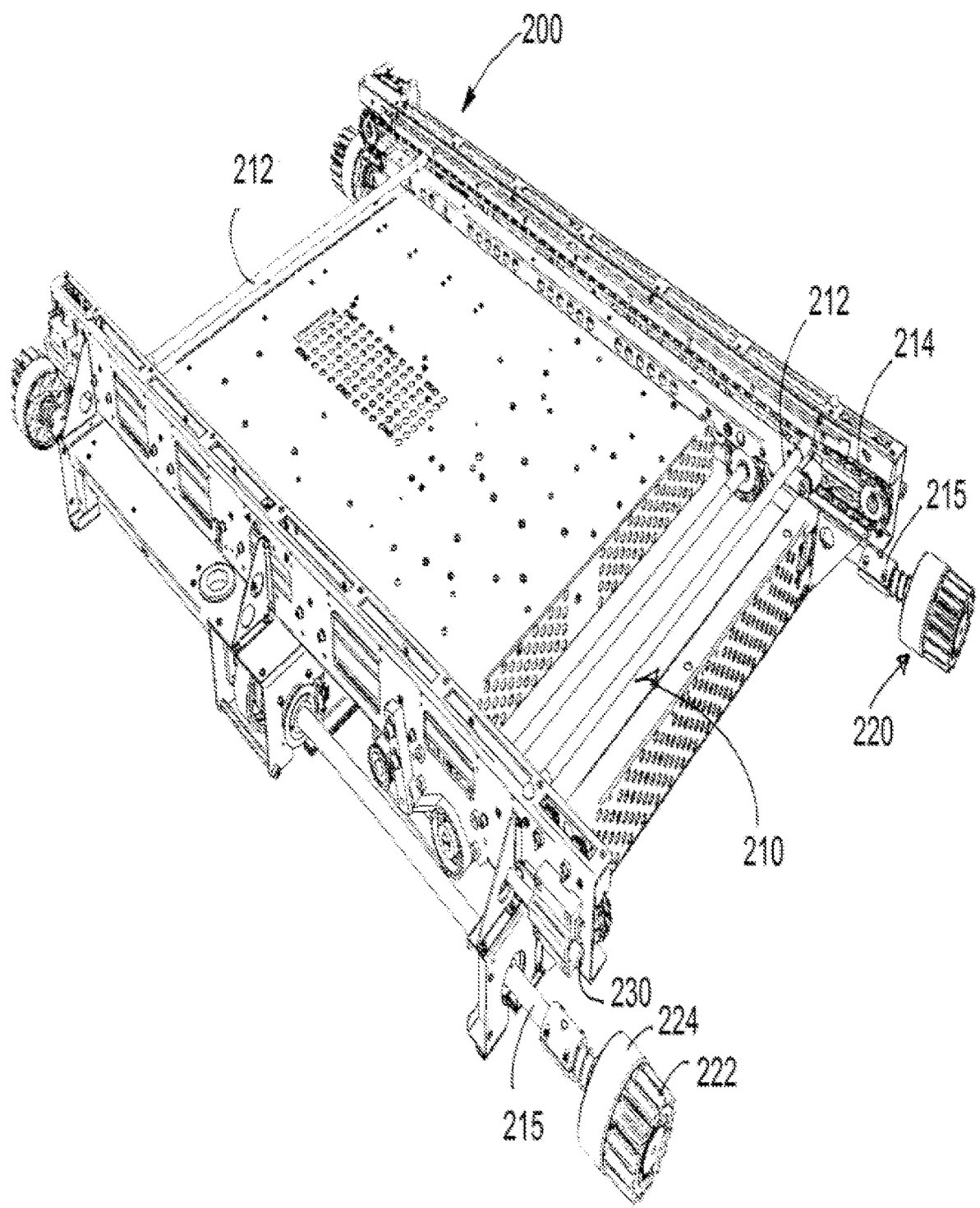
FIG. 8 is an enlarged perspective view of an alternate embodiment of a vehicle of the apparatus of FIG. 1.

As can be seen in FIGS. 1-3, the track 110 includes a front track 115 and a rear track 120. The front and rear tracks 115, 120 are parallel tracks that cooperate to guide the cars around the track. As shown in FIGS. 7-8, each of the cars includes four wheels 220: two forward wheel and two rearward wheels. The forward wheels 220 ride in the front track, while the rearward wheels ride in the rear track. It should be understood that in the discussion of the track, the front and rear tracks 115, 120 are similarly configured opposing tracks that support the forward and rearward wheels 220 of the picking vehicles. Accordingly, a description of a portion of either the front or rear track also applies to the opposing front or rear track.

Figure 9:
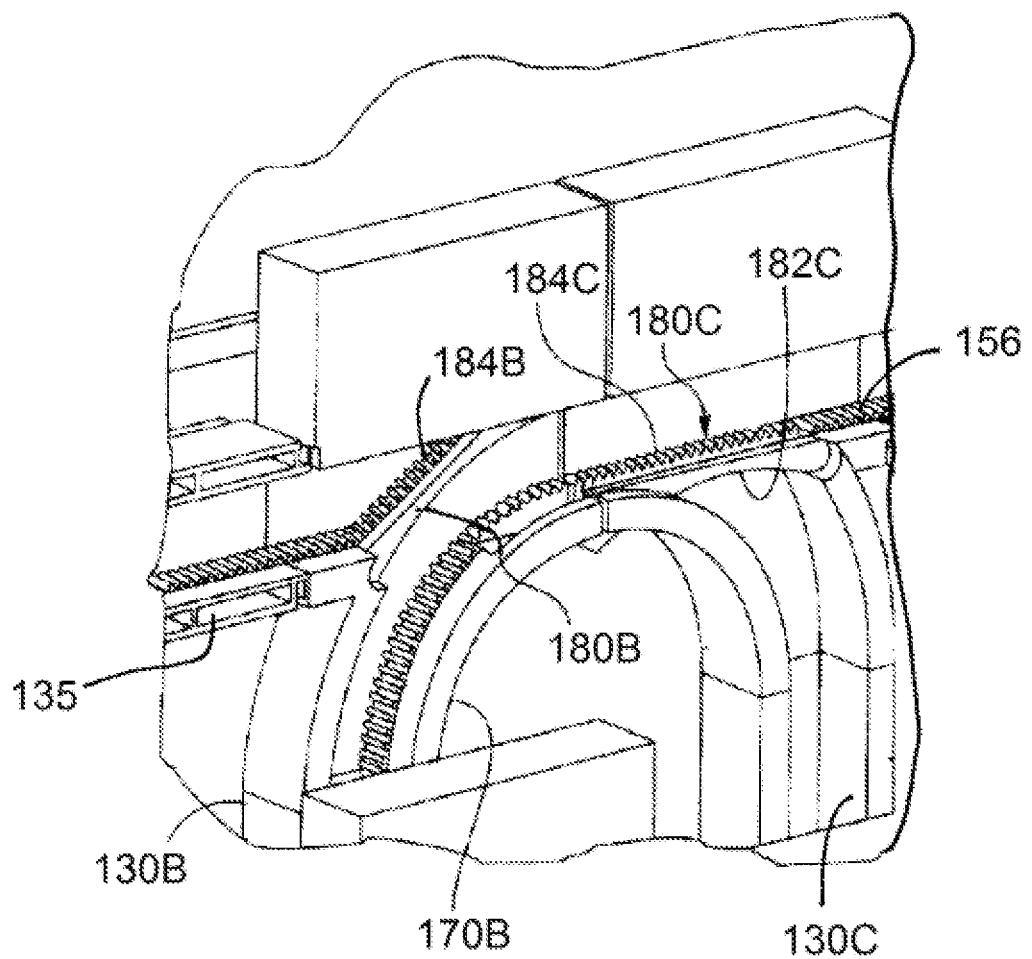
FIG. 9 is an enlarged fragmentary view of a portion of track of the apparatus illustrated in FIG. 1, showing details of gates in opened and closed positions.
Figure 10:
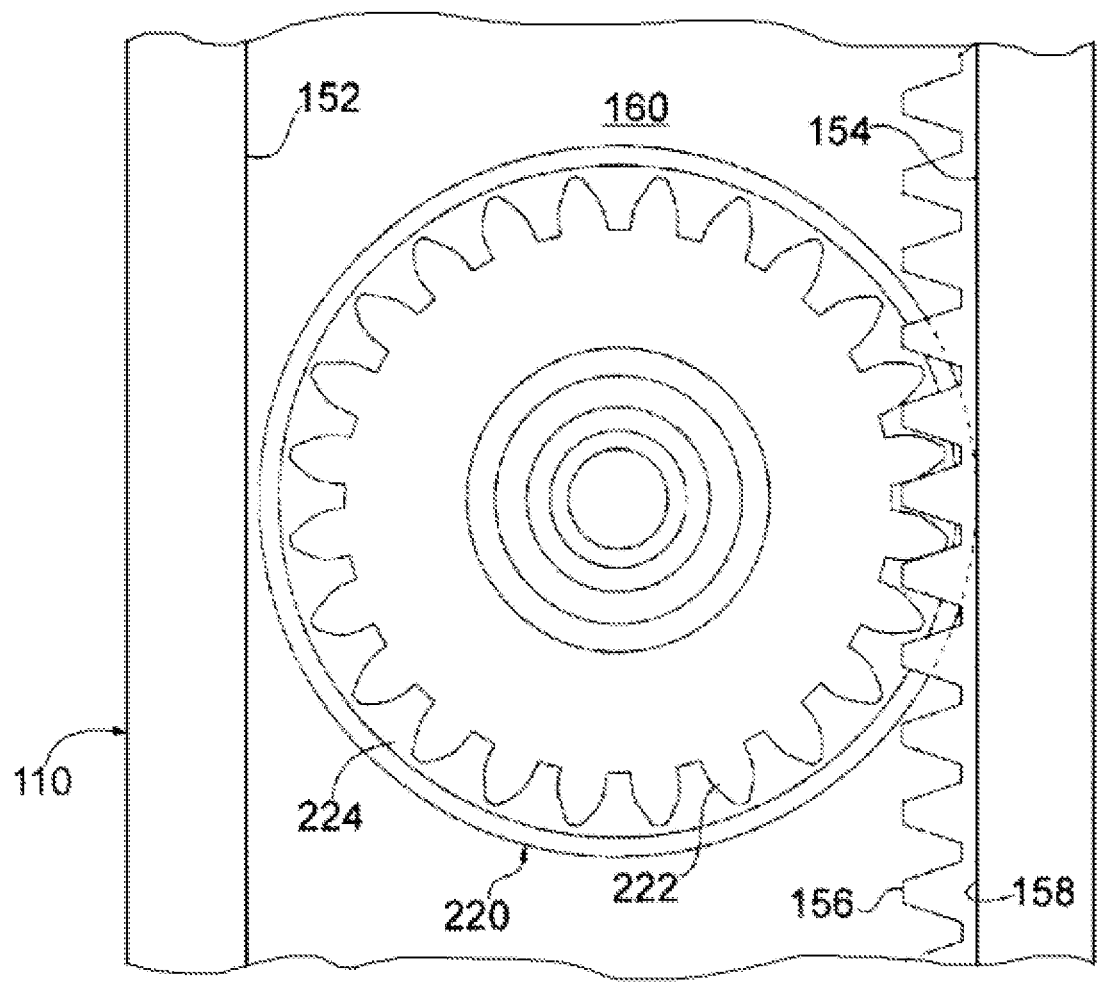
FIG. 10 is an enlarged view of a wheel of the delivery vehicle illustrated in FIG. 9, shown in relation to the track of the apparatus illustrated in FIG. 1.

Referring to FIGS. 9-10, the details of the picking track 110 will be described in greater detail. The track 110 includes an outer wall 152 and an inner wall 154 that is spaced apart from the outer wall and parallel to the outer wall. The track also has a back wall 160 extending between the inner and outer walls. As can be seen in FIGS. 9-10, the outer and inner walls 152, 154 and the back wall form a channel. The wheels 220 of the car ride in this channel.

The track includes both a drive surface 156 and a pair of guide surfaces 152, 158. The drive surface positively engages the cars to enable the car to travel along the track. The guide surfaces 152, 158 guide the car, maintaining the car in operative engagement with the drive surface 156. In the present instance, the drive surface 156 is formed of a series of teeth, forming a rack that engages the wheels of the cars as described further below. The guide surface 158 is a generally flat surface adjacent the rack 156. The rack 156 extends approximately halfway across the track and the guide surface 158 extends across the other half of the track. As shown in FIGS. 9-10, the rack 156 is formed on the inner wall 154 of the track. The opposing outer wall 152 is a generally flat guide surface parallel to the guide surface 158 of the inner wall.

As described above, the track includes a plurality of vertical legs 130A, 130B, 130C, 130D extending between the horizontal upper and lower rails 135, 140. An intersection 170 is formed at the intersection the upper rail 135 and vertical leg 130B, while a second intersection is formed at the intersection of upper rail 135 and vertical leg 130C. Similarly, intersections are formed at the intersection of vertical leg 130B and 130C with lower leg 140.

Each intersection includes an inner branch that is curved and an outer branch that is generally straight. The intersections at rail 130B are mirrors of the intersections with rails 130C. In FIG. 9, the intersection illustrates the portion of the track in which a vertical leg 130C intersects the upper leg 135. The intersections of the vertical leg with the lower rail incorporate similar intersections, except the intersections are reversed.

Figure 4:
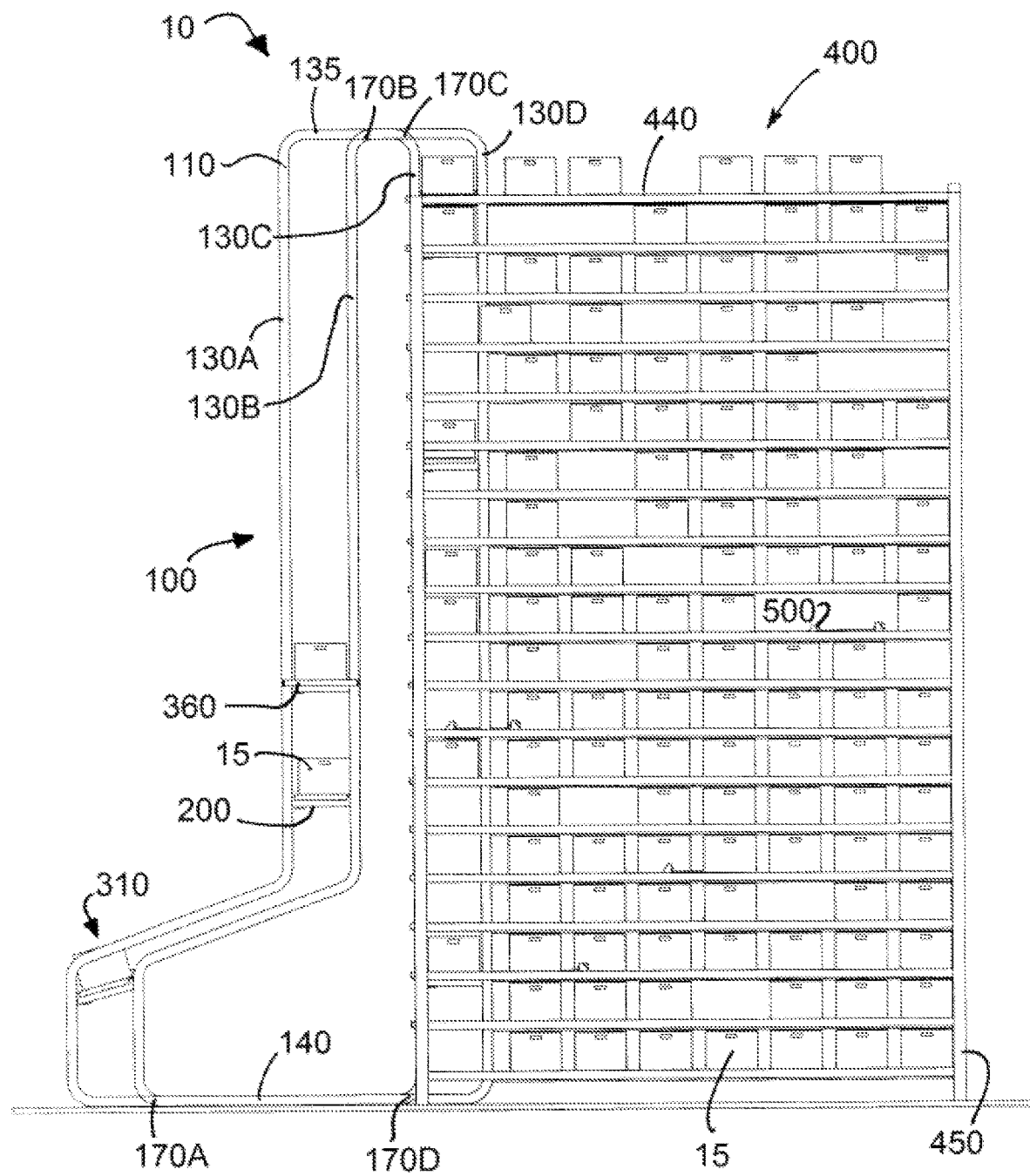
FIG. 4 is a side elevational view of the apparatus shown in FIG. 1.

Referring to FIGS. 4 and 9, intersections 170A, 170B, 170C, 170D include pivotable gates 180. Each gate 180 has a smooth curved inner race and a flat outer race that has teeth that correspond to the teeth of the drive surface 156 for the track. The gate 180 pivots between a first position and a second position. In the first position, the gate 180 is closed so that the straight outer race 184 of the gate is aligned with the straight outer branch of the intersection (see gate 180C in FIG. 9). In the second position, the gate is open so that the curved inner race 182 of the gate is aligned with the curved branch of the intersection (see gate 180B in FIG. 9).

Accordingly, in the closed position, the gate is pivoted downwardly so that the outer race 184 of the gate aligns with the drive surface 156. In this position, the gate blocks the car from turning down the curved portion, so that the car continues straight through the intersection. In contrast, when the gate is pivoted into the open position, the gate blocks the car from going straight through the intersection. Instead, the curved inner race 182 of the gate aligns with the curved surface of the inner branch 172 and the car turns through the intersection. In other words, when the gate is closed, a car goes straight through the intersection along either the upper rail 130 or the lower rail, depending on the location of the intersection. When the gate is opened, the gate directs the car from either a vertical rail to a horizontal rail or from a horizontal rail to a vertical rail, depending on the location of the intersection.

As can be seen in FIGS. 9-10, the end of the gate remote from the pivot point of the gate flares outwardly so that the curved inner race matches the curved profile of the inner branch when the gate is open. As a result, the gate has a generally L-shaped configuration. To accommodate the flared end of the gate 180, the drive surface 156 of the inner branch has a notch or recessed portion. When the gate is closed, the notch provides clearance so that the outer race 184 of the gate lies flat, parallel with the drive surface of the outer branch 176.

The gates 180 may be controlled by signals received from the central controller 350. Specifically, each gate may be connected with an actuator that displaces the gate from the opened position to the closed position and back. There may be any of a variety of controllable elements operable to displace the gate. For instance, the actuator may be a solenoid having a linearly displaceable piston.

Alternatively, the gates 180 may be controlled by an actuator on the cars 200. Specifically, the gates may include a passive actuator that responds to an actuator on the cars. If the actuator on the car engages the gate actuator, then the gate moves from a first position to a second position. For instance, if the gate is in a first position so that the vehicle will remain along the horizontal rail and the gate actuator on the car 200 engages the actuator on the gate, then the gate 180 will pivot upwardly into a second position so that the car will turn and move downwardly along the vertical rail 130.

After the car 200 passes through the gate, the gate may be configured to remain in the second position until actuated by the gate actuator on the car to return to the first position. Alternatively, after the car passes through the intersection, the gate 180 may automatically return to the first position.

In the foregoing description, the track 110 includes a single column for driving cars upwardly and a single column which the cars follow downwardly to the lower rail 140. In such a configuration, if there is a delay in loading or unloading an item at one of the transfer locations 375, the delay will impede the progress of all of the picking vehicles in the track behind the picking vehicle that is being delayed. Accordingly, it may be desirable to extend the picking track to that the system includes a plurality of columns that the picking vehicles can drive down.

The additional column(s) would extend the picking track 110 into the aisle 470 in the SAR system 400. Additionally, the transfer locations 375 may be elongated so that the both down columns of the picking track are adjacent the transfer locations. In this way, the central controller 350 can control the operation of gates along the picking track to determine whether the picking vehicles travels down the first down column or the second down column. Additionally, the SAR system 400 controls the positioning of the tote to be retrieved by the picking vehicle so that the tote is at the proper location along the length of the transfer location so that the tote can be loaded onto the picking vehicle.

Similarly, the picking track 110 can be extended to incorporate a plurality of up columns to increase the number of picking stations 310 or input stations 360 along the picking track. If two or more of up columns are incorporated, the system includes a number of gates and the central controller can control the gates to control which column to which each picking vehicle is directed.

Picking Vehicles

Referring now to FIGS. 7-8, the details of the picking vehicles 200 will be described in greater detail. Each delivery vehicle is a semi-autonomous car having an onboard drive system, including an onboard power supply. Each car may include a mechanism for loading and unloading items for delivery. Optionally, each car may also include a gate actuator 230 for selectively actuating the gates 180 to allow the vehicle to selectively change direction.

The car 200 may incorporate any of a variety of mechanisms 210 for transferring items between the car and the transfer areas 375. Additionally, the transfer mechanism 210 may be specifically tailored for a particular application. In the embodiment shown in FIG. 7, the loading/unloading mechanism 210 comprises a plurality of generally horizontal conveyor belt forming a platform for carrying totes or other items. The conveyor belts are reversible. Driving the belts in a first direction displaces the item toward the rearward end of the car; driving the belt in a second direction displaces the item toward the forward end of the car. The conveyor 210 is operable in response to signals received from the controller 350 to rotate to thereby drive items off the vehicle 200 or to pull items onto the vehicle.

A conveyor motor 255 mounted on the underside of the car drives the conveyor belts 212. Specifically, the conveyor belts 212 are entrained around a forward roller 213 at the forward edge of the car, and a rearward roller at the rearward edge of the car. The conveyor motor 255 is connected with the forward roller 213 to drive the forward roller, thereby operating the conveyor belts.

Alternatively, referring to FIG. 8, the transfer mechanism 210' comprises a displaceable bar configured to engage an item stored at a storage location 190 and pull the item onto the vehicle. More specifically, the vehicle may include a displaceable element configured to move toward a tote 15 in a storage location 100. After the displaceable element engages the tote 15, the displaceable element is displaced away from the storage location 100, thereby pulling the tote onto the car 200.

Referring to FIG. 8, in the present instance, the loading/unloading mechanism 210' may comprises a displaceable rod or bar 212. The bar 212 extends across the width of the car 200 and both ends are connected with drive chains 214 that extend along the sides of the car. A motor drives the chains to selectively move the chain toward or away from storage locations. For example, as the car approaches a transfer location 375 to retrieve a tote 15, the chain may drive the rod toward the transfer location so that the bar engages a groove or notch in the bottom of the tote. The chain then reverses so that the bar 212 moves away from the transfer location 375. Since the bar is engaged in the notch in the tote, as the bar moves away from the transfer location 375, the bar pulls the tote onto the car. In this way, the loading/unloading mechanism 210' is operable to retrieve items from a transfer location. Similarly, to transfer an item to a transfer location 100, the chain 214 of the loading/unloading mechanism 210' drives the bar 212 toward the transfer location until the item is in the transfer location. The chain continues to advance the bar 212 so that the bar moves downwardly and then retracts back toward the vehicle thereby disengaging the bar from the tote 15 to release the tote.

Additionally, since the transfer locations 375 can be located toward the forward side of the picking track 110 or the rearward side of the picking track the system is operable to transfer items toward transfer locations 375 on the forward side of the track or the rearward side of the track. Specifically, as shown in FIG. 8, the loading/unloading mechanism 210 includes two bars 212 spaced apart from one another. One bar is operable to engage totes in transfer location adjacent the front picking track 115 and the second bar is operable to engage totes in transfer areas adjacent the rear picking track 120.

As previously discussed, each car may also include a gate actuator for actuating the gate from a first position to a second position so that the car may change directions as the car travels along the picking track. The actuator may be any of a variety of elements configured to engage a corresponding element on the gate 180. The gate actuator may be selectively moveable between a first position and a second position. In the first position, the gate actuator is positioned so that it avoids engagement with the gate or other engagement element(s) along the track. In the second position, the gate actuator 230 is operable to engage a corresponding element along the track to actuate the gate.

The picking vehicles 200 include four wheels 220 that are used to transport the car along the picking track 110. The wheels 220 are mounted onto two parallel spaced apart axles 215, so that two or the wheels are disposed along the forward edge of the car and two of the wheels are disposed along the rearward edge of the car.

Referring to FIG. 10, each wheel comprises an inner idler roller 224 and an outer gear 222 that cooperates with the drive surface 156 of the track. The idler roller 224 rotates freely relative to the axles, while the outer gear is fixed relative to the axle onto which it is mounted. In this way, rotating the axle operates to rotate the gear 222. Additionally, the idler roller is sized to have a diameter slightly smaller than the distance between the upper wall 152 and the lower wall 154 of the track. In this way, the idler roller may rotate freely within the track, while ensuring that the gear 222 of each wheel remains in operative engagement with the drive surface (i.e. the teeth) 156 of the track. Accordingly, when the vehicle is moving horizontally, the rollers carry the weight of the cart, while the gears 222 cooperate with the drive surface 156 of the track to drive the vehicle along the picking track.

The car includes an onboard motor for driving the wheels 220. More specifically, the drive motor is operatively connected with the axles to rotate the axles 215, which in turn rotates the gears 222 of the wheels. In the present instance, the drive system is configured so that each gear is driven in a synchronous manner. Specifically, each gear 222 is connected to an end of one of the axles in a manner that substantially impedes rotation of the gear relative to the axle. In this way, each axle drives the attached two gears in a synchronous manner. Additionally, in the present instance, both axles are driven in a synchronous manner so that all four gears are driven in a synchronous manner.

There are various mechanisms that can be used to synchronously drive the axles. For instance, a pair of drive motors can be used to drive the axles, and the drive motors can be synchronized. Alternatively, a single drive motor may be used to drive both axles. Each axle may include a timing pulley rigidly connected to the axle to prevent rotation of the pulley relative to the axle. Similarly, a timing pulley may be connected to the motor shaft. The drive belt connecting the timing pulley on the axle with the motor may be a timing belt so that rotation of the drive motor is precisely linked to the rotation of the axle. Although a single timing belt can be used to drive both axles synchronously, a pair of timing pulleys may be connected to the motor shaft, and each timing pulley may be connected to a corresponding timing pulley on one of the axles.

The drive motor may include a sensor that is operable to detect the rotation of the motor to thereby determine the distance the car has traveled. Since the gears 222 are rigidly connected with the axles, which are in turn synchronously connected with the drive motor, the forward distance that the car moves can be exactly controlled to correlate to the distance that the drive motor is displaced. Accordingly, the distance that a car has traveled along the determined path depends on the distance through which the car motor is rotated.

To detect the rotation of the drive motor the motor may include a sensor for detecting the amount of rotation of the drive motor. For instance, the sensor 252 may be a sensor such as a hall sensor. The sensor detects the rotation of the motor and sends a signal to the central processor 350, which determines how far along the designate path the car has traveled based on the known information regarding the path and the rotation that the sensor detects for the motor.

The car 200 may be powered by an external power supply, such as a contact along the rail that provides the electric power needed to drive the car. However, in the present instance, the car includes an onboard power source that provides the requisite power for both the drive motor and the motor that drives the load/unload mechanism 210. Additionally, in the present instance, the power supply is rechargeable. Although the power supply may include a power source, such as a rechargeable battery, in the present instance, the power supply is made up of one or more ultracapacitors. The ultracapacitors can accept very high amperage to recharge the ultracapacitors. By using a high current, the ultracapacitors can be recharged in a very short time, such as a few seconds or less.

The car includes one or more contacts for recharging the power source. In the present instance, the car includes a plurality of brushes, such as copper brushes that are spring-loaded so that the brushes are biased outwardly. The brushes cooperate with a charging rail to recharge the power source, as described further below.

For instance, a pair of charging rails may be disposed beneath the lower horizontal rail 140. The charging rails are conductive strips connected with an electrical supply. The charging contacts of the car 200 engage the conductive strips to recharge the ultracapacitors. Specifically, the biasing element of the brushes biases the brushes outwardly toward the charging contacts. The electricity flowing through the charging contact provides a high amperage, low voltage source that allows the ultracapacitors to recharge in a few seconds or less. In addition, since the power supply provided by the ultracapacitors may last for only a few minutes, the car recharges each time it travels along the lower rail 140.

Each car may include a load sensor for detecting that an item is loaded onto the car. The sensor(s) ensure that the item is properly positioned on the car. For instance, the load sensor may include a force detector detecting a weight change or an infrared sensor detecting the presence of an item.

In the foregoing description, the cars have drive gears that interact with teeth in the track to guide the cars around the track. Additionally, as described further below in the operation section, the location of the car may be controlled based on information regarding how far the car has traveled. In such applications, it is desirable to synchronize the drive wheels of the car. However, in some applications alternative control systems may be used. For instance, the location of the cars can be controlled based on signals from sensors positioned along the track or indicators positioned along the track. In such instances, the cars may be configured to use a drive mechanism that is not synchronous as described above.

As discussed further below, the car further includes a processor for controlling the operation of the car in response to signals received from the central processor 350. Additionally, the car includes a wireless transceiver so that the car can continuously communicate with the central processor as it travels along the track. Alternatively, in some applications, it may be desirable to incorporate a plurality of sensors or indicators positioned along the track. The car may include a reader for sensing the sensor signals and/or the indicators, as well as a central processor for controlling the operation of the vehicle in response to the sensors or indicators.

Pick Station

As described previously, the picking system 10 is configured so that the picking vehicles 200 retrieve items from the transfer locations 375 and transport the items to the pick station 310. Referring now to FIGS. 1-6 the pick station 310 will be described in greater detail.

In one mode of operation, the system 10 is used to retrieve items needed to fill an order. The order may be an internal order, such as parts needed in a manufacturing process in a different department, or the order may be a customer order that is to be filled and shipped to the customer. Either way, the storage and retrieval system 400 retrieves the items from the storage areas and delivers the items to the transfer locations 375.

The picking vehicles retrieve items from the transfer locations 375 and deliver them to the picking station 310 so that an operator can pick the required number of an item from a tote. Additionally, in some instances an automated mechanism can be used to automatically pick an item from a picking vehicle at the picking station. For instance, an arm or other mechanical device may reach into the tote and automatically select an item from the tote and then remove the item or the device can remove the entire tote or container on the picking vehicle. Accordingly, it should be understood that when the description or claims state that an operator picks an item, the operator may be a human operator or a mechanical operator.

After the item is picked from a tote, the car advances so that the next item required for the order is advanced toward the picking station 310. The system continues in this manner so that the operator can pick all of the items needed for an order.

In the present instance, the pick station 310 is configured so that the car travels upwardly to present the contents to the operator so that the operator can more easily retrieve items from the tote 15. Referring to FIG. 1, at the picking station the track includes a curved section 315 that bends upwardly and away from the operator. In this way, the car moves upwardly and then stops at a height that facilitates the operator removing items from the tote. After the operator removes items from the tote, the car moves away from the operator. For instance, as shown in FIG. 1, when the operator is a human operator, the track may be configured so that the tote moves horizontally away from the operator and up away from the operator toward the upper horizontal rail 135.

The system can also control the operation of the cars to tilt the cars at the picking station 310 thereby making it easier for the operator to retrieve items from the tote. For instance, as the car approaches the picking station, the controller 350 may control the car so that the rearward set of wheels (i.e. the wheels in connecting leg 110B) continue to drive after the forward set of wheels stop (i.e. the wheels in connecting leg 110A). This raises the rearward edge of the car (from the perspective of the operator). After the operator picks the items from the tote, the forward set of wheels (relative to the operator) drive first, thereby level off the car. Once leveled, the four wheels drive synchronously. Alternatively, the picking vehicle may remain level at the picking station and a mechanism may lift an edge of the tote to tilt the rearward edge of the tote upward to present the contents to the operator. Accordingly, either the picking car or the tote or both may be manipulated to raise an edge of the tote upwardly to present the contents to the operator at the picking station.

The pick station 310 may include a plurality of items to improve the efficiency of the pick station. For instance, the pick station may include a monitor to display information to aid the operator. As the car approaches the pick station, the system 10 may display information such as how many items need to be picked from the tote for the order. Additionally, since the operator may pick items for multiple orders, the system may display which order(s) the item is to be picked for, in addition to how many of the item are to be picked for each order. The system may also display information such as how many items should be remaining in the tote after the operator picks the appropriate number of items from the tote.

The system may also include a sensor for sensing that an item has been removed from a tote so that the car can automatically advance away from the pick station after the operator picks the items. Similarly, the system may include a manually actuable item, such as a button, that the operator actuates after picking the appropriate number of items from a tote. After the operator actuates the button, the system advances the tote away from the picking station.

In the present instance, the pick station 310 is positioned at one end of the array of SAR system 400. However, it may be desirable to incorporate multiple pick stations around the SAR system. For instance, a second picking system having a second picking station can be positioned along the opposite end of the SAR system 400. Alternatively, the SAR system 400 may have a plurality of columns and a number of picking systems can be positioned along an end of the SAR system.

Accordingly, it should be understood that the configuration of the track is not limited to a single picking station. For instance, a second picking station may be position above the picking station 310 shown in FIG. 1. In such a configuration, the upper picking station has a track that intersects the upper portion of vertical tracks 130A, 130B. A gate along the vertical tracks 130A, 130B selectively direct the picking vehicles toward the picking station. For instance, a gate similar to the gate 180 described above may be operable to direct picking vehicles toward the upper picking station when the gate is in a first position, while allowing vehicles to continue up the vertical rail when the gate is in the second position. Additionally, the vertical rails 130A, 130B may include a vertical section that extends down to the lower rail 135, bypassing the first picking station. Two gates can be positioned at the intersection with the lower rail 135 so that in a first position the gates direct the picking vehicle toward the first picking station 310 (shown in FIG. 1) and in a second position, the gates direct the picking vehicle up the vertical rails 130A, 130B bypassing the first picking station.

In the foregoing description, the system is discussed as being used to retrieve a discrete number of items to be used to fill an order. The operator picks the items from one or more totes as the totes are presented to the operator and the operator agglomerates the items, such as by placing the items into a container for shipping. Alternatively, rather than agglomerating a plurality of items, the system may incorporate one or more buffer conveyors that convey items away from the system. The operator places the picked items onto the buffer conveyor in the appropriate order and the conveyor(s) convey the items away from the system.

After the operator removes the appropriate item(s) from one of the cars, the car moves away from the pick station 310. Specifically, the onboard controller sends a signal to start the drive motor. The drive motor rotates the axles, which in turn rotates the gears 222 on the wheels 220. The gears 222 mesh with the drive surface 156 of the vertical rails to drive the car upwardly. Specifically, the gears and the drive surfaces mesh and operate as a rack and pinion mechanism, translating the rotational motion of the wheels into linear motion along the track 110.

As the car moves away from the pick station, the system determines the transfer location 375 at which the car is retrieve its next item(s) and transfer the item(s) it is carrying. If the system is not able to determine which transfer location the car is to be directed before the car reaches the top of the track 110, the car can simply loop around the track and re-start the process.

Once the central controller 350 determines the appropriate transfer location 375 for the item, the central controller then controls the operation of the car to actuate the gates along the track as necessary to direct the car to the appropriate transfer location. The car stops at the appropriate transfer location 375 and the item on the picking vehicle 200 is transferred off the picking vehicle. Additionally, another item may be transferred onto the picking vehicle while it is stopped at the transfer location. Alternatively, after discharging the item at the transfer location 375, the vehicle may move to a different transfer location, stop and then load an item onto the picking vehicle.

Although the picking vehicle can drop-off and pick-up items at different transfer locations, in the present instance, the picking vehicle drops off an item and picks up the next item while stopped at the same transfer station. Further still, as discussed below, in the present instance, while the picking vehicle is stopped to discharge a first item, a second item is loaded onto the picking vehicle while the first item is being discharged.

Referring to FIG. 9, as the wheels on the leading axle of the vehicle (i.e. the wheels traveling up rail 130B) approach the intersection 170 with upper rail 135, the gate 180B at the top of vertical rail 130B remains open and the gate 180C at the top of vertical rail 130C remains in the closed position. Therefore, the open gate 130B allows the wheels to drive up into the upper rail 135 and onto the outer race 184C of the gate 180C. In this way, in the closed position, gate 180C provides a straight drive surface that cooperates with the drive surface 156 to allow the lead axle of the car to travel over vertical track 130C.

Once the leading axle travels past the closed gate 180C, the gate 180B is pivoted into the closed position and the gate 180C is pivoted into the open position. The wheels on the rear axle can then drive over the outer race of 184B of closed gate 180B. The inner race 182C of gate 180C then directs the wheels on the rear axle down vertical leg 130C. At the same time, there is no gate at the top of vertical leg 130D, so the wheels on the lead axle travel down vertical leg 130D as the wheels on the trailing leg travel down leg 130C. As the car approaches the intersections at the bottom of legs 130C and 130D, the gates at the bottom of legs 130B and 130C are operated similarly to the above description, but in reverse.

In the foregoing description, the operation of the gate 180B is described as a single gate at the top of vertical leg 130B and a single gate 180C at the top of vertical leg 130C. However, it should be understood that as described previously, the picking track 110 comprises a front track 115 and an opposing rear track 120 that is a substantial mirror of the front track. Therefore, there are actually two of each vertical legs 130A, 130B, 130C and 130D. Similarly, there is a gate at the top of both vertical legs 130B and at the top of both vertical legs 130C. When the foregoing description recites that gate 180B at the top of vertical leg 130B is open, it actually refers to two gates being opened: the gate at the top of vertical leg 130B on the front track 115 and the gate at the top of vertical leg 130B on the rear track 120. Similarly, when the foregoing description recites that gate 180B at the top of vertical leg 130B is closed, it actually refers to two gates being closed: the gate 130B at the top of vertical leg 130B on the front track 115 and the gate 180B at the top of vertical leg 130B on the rear track 120. The same is true for the description of the gate 180C at the top of vertical leg 130C.

One of the advantages of the system as described above is that the orientation of the cars does not substantially change as the cars move from travelling horizontally (along the upper or lower rails) to vertically (down the vertical legs 130A, 130B, 130C, 130D). Specifically, when a car is travelling horizontally, the two front geared wheels 220 cooperate with the upper or lower horizontal rail 135 or 140 of the front track 115, and the two rear geared wheels 220 cooperate with the corresponding upper or lower rail 135 or 140 of the rear track 120. As the car passes through a gate and then into a column, the two front geared wheels engage a pair of vertical legs 130 in the front track 115, and the two rear geared wheels engage the corresponding vertical legs in the rear track 120. It should be noted that when it is stated that the orientation of the cars relative to the horizon do not change, this refers to the travel of the vehicles around the track. Even though the cars may tilt relative to the horizon at the picking station, the cars are still considered to remain in a generally constant orientation relative to the horizon as the cars travel along the track 110.

As the car travels from the horizontal rails to the vertical columns or from vertical to horizontal, the tracks allow all four geared wheels to be positioned at the same height. In this way, as the car travels along the track it does not skew or tilt as it changes between moving horizontally and vertically.

Traffic Control

Since the system includes a number of cars 200, the system controls the operation of the different cars to ensure the cars do not collide into one another. In the following discussion, this is referred to as traffic control.

A variety of methodologies can be used for traffic control. For instance, the traffic control can be a distributed system in which each car monitors its position relative to adjacent cars and the onboard controller controls the car accordingly. One example of such a system utilizes proximity sensors on each car. If the proximity sensor for a car detects a car within a predefined distance ahead of the car, the onboard controller for the trailing car may control the car by slowing down or stopping the trailing car. Similarly, if a car detects a car within a predefined distance behind the car, the lead car may speed up unless the lead car detects a car ahead of it within the predefined distance. In this way, the cars may control the speed of the cars independently based on the feedback from the proximity sensors.

Although the system may use a distributed system for traffic control, in the present instance, the system uses a centralized system for traffic control. Specifically, the central controller 350 tracks the position of each car 200 and provides traffic control signals to each car based on the position of each car relative to adjacent cars and based on the route for each car.

In the present instance, the central controller 350 operates as the traffic controller, continuously communicating with the cars as the cars travel along the track 110. For each car, the central controller determines the distance that each car can travel, and communicates this information with the cars. For instance, if car B is following car A along the track, and car A is at point A, car B can safely travel to a point just before point A without crashing into car A. As car A advances to a subsequent point B along the track, car B can travel safely to a point just before point B without crashing into car A.

The cars continuously communicate with the central controller to provide information indicative of their positions, so that the central controller can continuously update the safe distances for each car as the cars advance around the track.

Although the foregoing discussion is limited to determining safe zones based on the positions of the various cars on the track, the determination of safe zones is based on other factors that affect the traffic. For instance, when calculating the safe distance for a car, the central controller considers the distance between the car and the next gate, as well as the distance to the transfer location(s) to which the car is destined.

As can be seen from the foregoing, increasing the frequency of communication between the cars and the central controller increases the efficiency of the traffic flow along the track. In addition, to the foregoing variables used to calculate safe distances, information regarding the track profile ahead of each car is used to calculate safe distances. For instance, the central controller determines whether the path ahead of a car is sideways movement, uphill movement (i.e. movement vertically upwardly) or downhill movement (i.e. movement vertically downwardly).

One of the issues in traffic control relates to merging at intersections 170. The problem arises when a car needs to merge onto the return rail 140. If two cars will arrive at the intersection close enough to collide, one of the cars needs to have priority and the other car needs to wait or slow down to allow the first car to go through. This is particularly true if the system incorporates a second picking station positioned above a first picking station as discussed above.

One method for controlling merging traffic is based on determining the next gap large enough for a car to have time to pass through an intersection without colliding with another car. In other words, if a first car approaches an intersection and it is determined that the gap between the first car and a second car is not sufficient for the first car to pass through, the first car waits at the intersection until there is a gap large enough to allow the first car to pass through.

Storage and Retrieval System

As described above, the picking system 100 comprises a plurality of picking vehicles that circulate around a picking track 110 to drop off and receive items from one or more transfer locations positioned along the picking track 110. The picking vehicles then convey the retrieved items to a picking station so that an operator can pick the requisite item.

The Storage and Retrieval system (SAR) 400 retrieves items from a plurality of storage locations and conveys the items to the transfer locations 375 to be picked up by the picking vehicles. Additionally, the SAR system 400 retrieves items from the picking vehicles 200 and stores the items in the storage locations. In this way, the SAR system 400 handles the storage and retrieval of items to and from thousands (or potentially millions) of storage locations and conveys the items to one of the transfer locations. By separating the SAR system 400 from the picking system 100, any of a variety of SAR systems can be combined with the picking system 100. The SAR system simply needs to be configured to convey items from the storage locations to the transfer locations and return items from the transfer locations to the storage locations.

Since the picking station is operable to work in connection of any SAR 400 systems, it should be understood that the configuration of the SAR system can vary widely. Therefore, it should be understood that the following description is an exemplary embodiment and is not intended to limit the variety of SAR systems that can be used in connection with the picking system 100.

Referring to FIGS. 1-6, the SAR system 400 will now be described in greater detail. The illustrated SAR 400 incorporates one or more storage racks 410 having a plurality of storage locations. In the present instance, the storage rack comprises a vertical array of generally horizontal rows. A plurality of storage locations are located along each horizontal row and the rows are vertically spaced apart from one another. Additionally, in the present instance, the SAR 400 is illustrated with two parallel storage racks 410A and 410B. The storage racks 410A, 410B are spaced apart from one another creating an aisle 420 between the racks.

In the foregoing description, the details of storage rack 410A will be described. It should be understood that storage rack 410B is configured substantially similarly to rack 410A.

The storage rack 410A comprises a plurality of horizontal supports 440 connected to a plurality of vertical supports 450. Specifically, rack 410 is formed of four vertical supports 450. Each row is formed by a pair of parallel horizontal supports 440. Each end of each horizontal support is connected with one of the vertical supports. Additionally, each horizontal support 440 provides support for the row of bins or totes 15. For instance, a shelf may be provided to support each row of totes 15. The shelf is supported by a pair of parallel horizontal supports 440.

Figure 5:
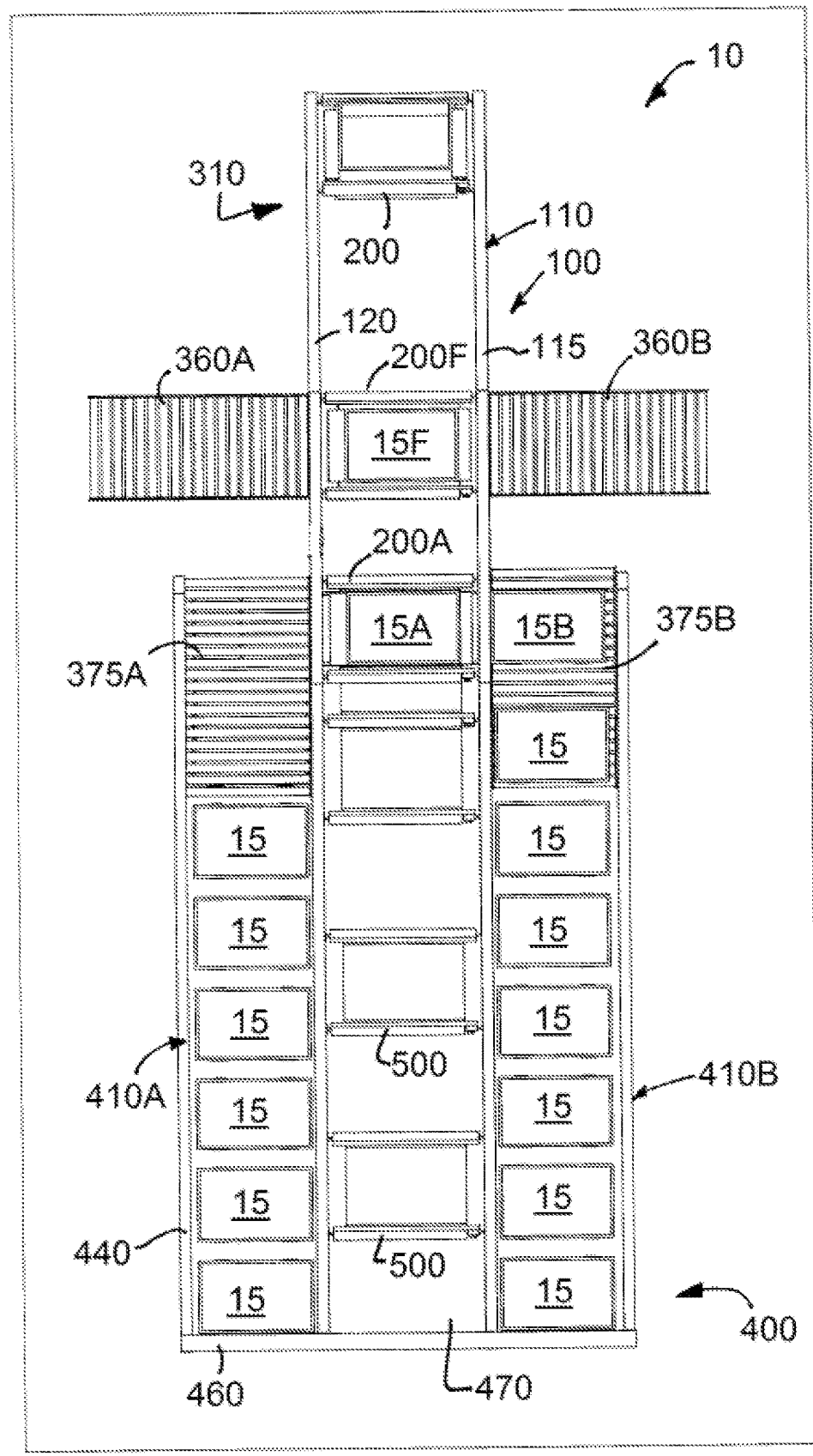
FIG. 5 is a plan view of the apparatus shown in FIG. 1.

As shown in FIG. 1, cross members 460 extend horizontally, transverse the horizontal supports to interconnect the vertically members to form a stable rigid rack 410. As shown in FIG. 5, an aisle 470 is formed between racks 410A and 410B.

In the present instance, the SAR system 400 includes a plurality of shuttles 500 for storing and retrieving items from the plurality of storage locations. Specifically, the shuttles 500 are positioned in the aisle 470 between rack 410A and rack 410B. The shuttles 500 drive in a track formed on each horizontal support 440. For instance, the track may be formed on the outside edge of each support or the track may be formed on an upper edge of each horizontal support.

Figure 6:
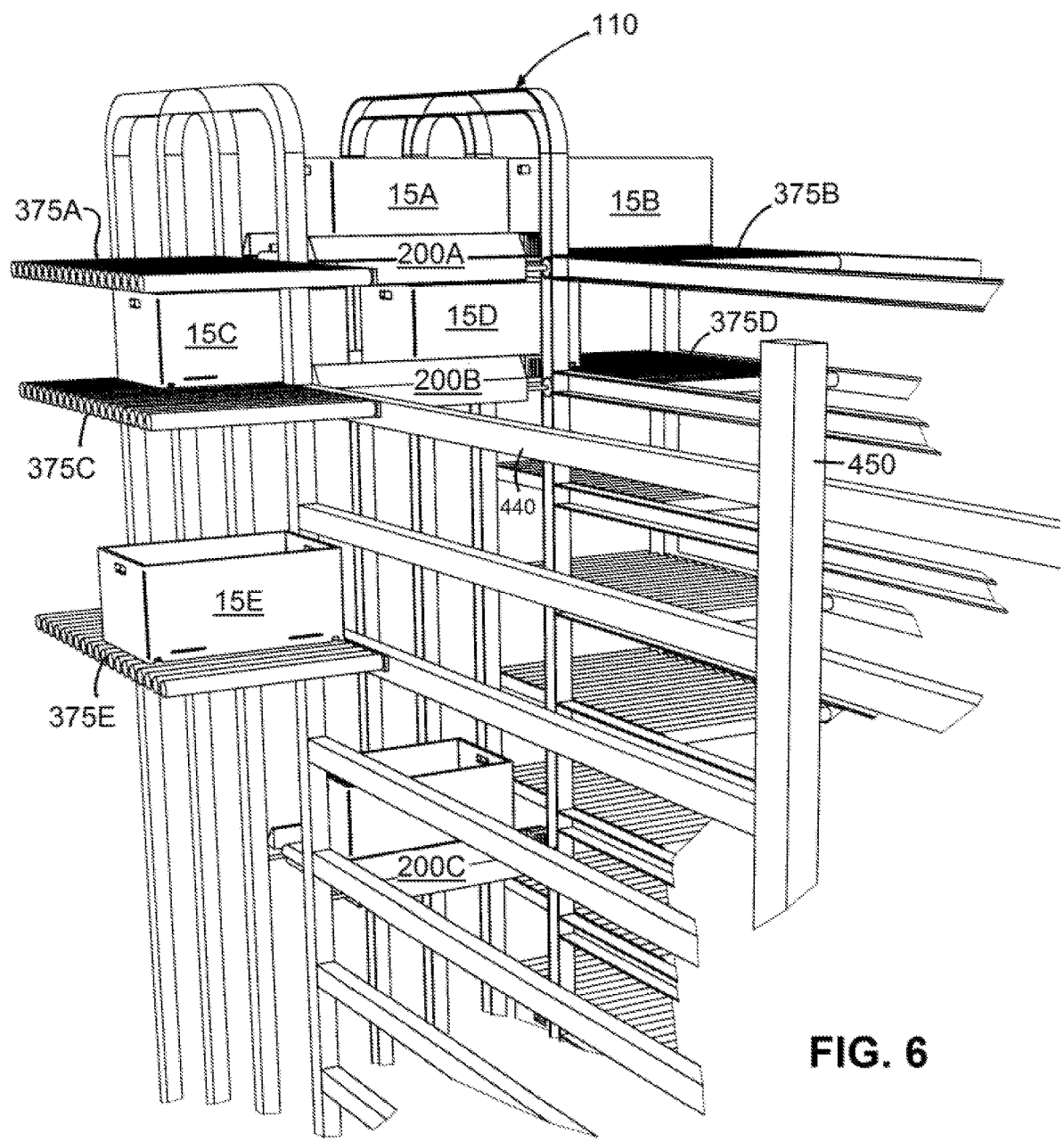
FIG. 6 is a fragmentary perspective view of a portion of the apparatus show in FIG. 1, illustrating details of the transfer of bins from a picking section of the apparatus to a storage section of the apparatus.

In the present instance, each shuttle 500 comprises a vehicle having a pair of axles and a pair of wheels are mounted on each axle. In this way, two wheels of a shuttle are supported by a horizontal support 440 of rack 410A while two wheels of the shuttle are supported by an opposing horizontal support of rack 410B as shown in FIG. 5. Additionally, as shown in FIGS. 5 and 6, the SAR system 400 is configured so that the SAR system operates independently of the picking vehicles 200 and the picking track 110. In particular, the track of the SAR system 400 is separate from the picking track 110. For example, the SAR track terminates separate from the picking track 110 to impede shuttles 500 from entering the picking track. In particular, as shown in FIG. 6, the vertical portion of the picking track 110 forms a wall operating as a stop that prevents shuttles 500 from travelling into the picking track 110.

Although the transfer locations 375 may be located at various positions in the SAR system 400. In the embodiment illustrated in FIGS. 1-6 a transfer location is positioned at the end of each row in each of racks 410A and 410B. In this way, each row has a corresponding transfer location at the end of rack 410A and a parallel transfer location at the end of rack 410B.

Each shuttle 500 travels back and forth along its respective row storing totes and retrieving totes in response to commands received by the central controller 350. Specifically, each shuttle includes a transfer mechanism for transferring totes 15 off the shuttle and into a storage location in the row or a transfer location at the end of the row. Similarly, the transfer mechanism is operable to load totes onto the shuttle from one of the storage locations in the row or from one of the transfer locations at the end of the row.

The transfer mechanism for the shuttle 500 may include any of a variety of mechanisms for transferring totes. For instance, the transfer mechanism may include telescoping arms that extend from the shuttle toward the tote, engage the tote and then retracts to pull the tote onto the shuttle. Similarly, to transfer a tote from the shuttle onto a storage location, the telescoping arms engage the tote and then extend to drive the tote toward the storage location. Once the tote is in the storage location, the arms disengage the tote and retract back onto the shuttle. Alternatively, the shuttle 500 may include other types of transfer mechanisms, such a reversible conveyor forming a generally horizontal surface on which the tote rests. By driving the conveyor in a first direction, the tote may be ejected toward a storage location in a row of the first rack 410A, while driving the conveyor in a second direction ejects the tote rearwardly toward a storage location in parallel row of the second rack 410B. Similarly, a transfer mechanism may be provided in each storage location to push or pull the totes toward or away from the shuttle. For instance, the shuttle conveyor may drive a tote toward a storage location and then a transfer mechanism on the storage rack can pull the tote onto the rack to pull the tote clear from the shuttle. Similarly, when the shuttle is a storage location, the transfer mechanism on the rack can push a tote toward the shuttle until the tote engages the conveyor of the shuttle. Once the tote engages the shuttle, driving the conveyor on the shuttle pulls the tote onto the shuttle.

Accordingly, as can be seen, a variety of transfer mechanisms can be utilized to transfer the totes between the shuttles and the storage locations. The transfer mechanisms can be mounted on the shuttles, the racks or both. In addition to transferring totes between the shuttles and the storage locations, the transfer mechanisms are operable to transfer totes between the shuttles and the transfer locations 375.

In order to fill an order, the central controller 350 determines the location of each item to be retrieved and then directs the appropriate shuttles 500 to retrieve the items from the respective storage locations and transfer the items to the transfer locations at the end of the row. The central controller then controls a corresponding number of picking vehicles 200 to drive a picking vehicle to each of the transfer locations where an item for the order has been transferred. As a picking vehicle 200 reaches the transfer location 375 where it is to pick up an item, the vehicle may stop along the picking track 110 adjacent the transfer location.

While at the transfer location 375, the system transfers an item between the transfer location and the picking vehicle 200. The item may be transferred either from the picking vehicle to the transfer location or from the transfer location to the picking vehicle. In a typical operation of the system 10, while the picking vehicle is stopped at a transfer location, an item is transferred from the picking vehicle to the transfer location and another item is transferred from a transfer location to the picking vehicle.

More specifically, in the present instance, the items are transferred in totes 15. As a vehicle is conveyed away from the picking station 310, the central controller directs the picking vehicle to a point along the picking track 110 adjacent two transfer locations. For instance, referring to FIGS. 1, 4-5, the picking track 100 extends into the aisle 470 between SAR racks 410A and 410B so that vertical rails 130C and 130D are positioned between transfer locations 375A and 375B. The SAR system 400 controls the flow of totes so that one of the transfer locations is open while a tote to be retrieved by the picking vehicle is on the parallel transfer location. For example, in FIG. 5, tote 15A on the picking vehicle is to be transferred to transfer location 375A, which is open so it can receive tote 375A. Additionally, tote 15B on transfer location 375B is to be transferred onto the picking vehicle. As shown in FIG. 6, transfer locations 375A, 375B are located at the ends of parallel rows in the SAR system 400 so that the two transfer locations are at substantially the same height so that the picking vehicle can transfer totes to and from both transfer areas while the picking vehicle is adjacent the transfer locations.

The transfer of totes between the picking vehicle and the transfer locations can be performed in series (i.e. tote 15A is transferred off the picking vehicle and onto transfer location 375A and then tote 15B is transferred onto the empty picking vehicle from transfer location 375B. However, the operation of the system can be expedited by transferring a tote onto the picking vehicle while a tote is being transferred off the picking vehicle. To facilitate the concurrent transfer of totes, a transfer mechanism is provided at the transfer location and a separate transfer mechanism is provided on the picking vehicle. For example, the transfer mechanism at the transfer location may be a pusher element that pushes tote 15B from transfer location 375B toward the picking vehicle. For instance, one or more rollers or belts at the transfer location may drive the tote toward the picking vehicle. For example, the transfer mechanism may include a plurality of roller or belts disposed between the rollers at the transfer locations. To transfer the tote, the roller or belts extend upwardly from between the rollers and engage the bottom of the tote. The rollers or belts are then driven forwardly to drive the tote toward the picking vehicle. Additionally, while the picking vehicle is stopped, the conveyor belt 210 on which tote 15A rests is actuated. By driving the conveyor belt 210 forwardly, tote 15A is driven off the vehicle and onto transfer location 375A. A transfer mechanism, such as pop-up rollers or belts described above, may engage the tote 15A to drive the tote 15A onto the transfer location. Additionally, driving the conveyor belt 210 forwardly drives tote 15B onto the picking vehicle while tote 15A is being discharged. In this way, a tote may be loaded on the picking vehicle from one transfer location while a second tote is being discharged from the picking vehicle. In this way, the transfer time for discharging a first tote and retrieving a second tote is substantially reduced.

As shown in FIGS. 1-6, in the present instance the transfer locations include conveyors for conveying totes along the length of the transfer locations 375. For instance, the transfer locations are illustrated as being a series of elongated rollers for roller beds. The system includes a drive mechanism for driving the rollers to control movement of the totes one the transfer locations.

Referring to FIG. 6, the flow of totes between the picking vehicles and the transfer locations is illustrated. Additionally, the flow of totes along the transfer locations is illustrated. As discussed previously, FIG. 6 illustrates a picking vehicle 200A along the picking track 110 between transfer location 375A and 375B. In FIG. 6, the transfer of totes 15A, 15B between the vehicle 220A and the transfer locations has not yet commenced. Below the first picking vehicle 220A, a second picking vehicle 220B is stopped along the picking track between transfer locations 375C and 375D. The transfer of the totes is partially completed. Tote 15C is partially on the picking vehicle 220B and partially discharged onto the transfer location 375C. Additionally, tote 15D is partially loaded onto the picking vehicle 220B while a portion is still on transfer location 375D. Below transfer location 375C is tote 15E on transfer location 375E. Tote 15E has been discharged from picking vehicle 220C which has driven away from transfer location 375E. Additionally, the rollers of transfer location 375E have been actuated to drive tote 15E rearwardly (i.e. away from the picking system 100). Once the tote 15E is driven toward the rearward end of the roller bed, the roller bed stops so that the tote can be transferred onto one of the shuttles.

In the foregoing description, the transfer locations have been described as staging locations where items are transferred from the shuttles so that the items can then be transferred onto the picking vehicles. However, in certain applications, the transfer locations may be positions along the SAR system where the shuttles are adjacent the picking track so that items can be transferred directly from the shuttles to the picking vehicles. For instance, as shown in FIG. 5, the illustrated SAR system 400 includes shuttles 500 that operate in an aisle that is aligned with the space between the front track 115 and the rear track 120 of the picking station. Instead, the SAR system 400 can be configured so that the shuttles 500 a positioned in aisles that are aligned with where the racks are illustrated in FIG. 5. In this way, when a shuttle 500 is driven to the end of a row adjacent the picking system 100, the shuttle is adjacent the picking track and positioned so that a tote can be transferred directly from the picking vehicle to the shuttle or vice versa. Accordingly, it should be understood that the term transfer locations includes either a staging area as shown in FIGS. 1-6 or a location where a moveable storage and retrieval device, such as shuttle 500, can be positioned to transfer a tote directly with a picking vehicle stopped along the picking track.

In light of the foregoing, the following discussion describes an exemplary series of steps that the system may take to fill an order for four separate items stored in four separate storage locations. The system 10 will assign each of the four items to one of four picking vehicles 200 as follows.

The central controller 350 calculates the theoretical time it will take the SAR system 400 to retrieve each item in an order. Specifically, for each of the items in an order, the central controller calculates the theoretical time it will take a shuttle 500 to retrieve an item and transfer the item to one of the transfer locations 375. After the estimates are determined for each item in an order, the central controller 350 assigns the items to a series of picking cars to attempt to have the picking cars retrieve the items from the various transfer locations and return in the desired order or at approximately the same time.

For instance, in an order for four items, the first item may be stored in a storage location that is farthest from one of the transfer locations and the last item may be closest to one of the transfer locations, with the second and third items in between. Accordingly, the first car may be assigned to retrieve the fourth item, since it will be ready for pick-up first. The second and third cars may be assigned the second and third items in the order, and the fourth car may be assigned the first item in the order since it will be the last item ready. In this way, the system controls the sequence of assigning cars to retrieve items in order to improve the likelihood that the cars will return to the picking station as a series of consecutive cars carrying the items for the order. Additionally, it will minimize the amount of time that picking vehicles have to wait while the car in front of it transfer items to and/or from a transfer location. Further still, it should be appreciated, that the location of the transfer location to which a picking vehicle must go to retrieve an item may also affect the order in which items are assigned to the vehicles. For example, if two items in an order are stored in storage locations that are similar distances from the end of a row, the first picking vehicle may be assigned to retrieve the item from the transfer location that is on the lower row of the storage rack 410. In this way, it is less likely that the second picking vehicle will need to wait behind the first picking vehicle because the first vehicle is retrieving an item that is further along the track 100 than the transfer location to which the second vehicle is destined.

In some applications, it is desirable to control the sequence of the cars so that the cars arrive at the picking station in the exact sequence requested for an order (i.e. First item first, second item next, etc). However, in many applications it is sufficient to have the cars arrive in a sequence of continuous cars having items for the order (i.e. four cars containing the items for the order without any cars in between the four cars with items of other orders).

Although the above description discusses assigning retrieval tasks to a series of cars so that the cars return a sequence of cars to fill an order, it should be understood that the picking station may be configured so that the operator can simultaneously pick items for more than one order. Therefore, the system can further improve the flow of picking cars and the timing of the retrieval so that the picking cars return items for multiple orders. In essence, rather than considering the items for only one order and assigning the picking cars to retrieve the items for that order before assigning picking cars for the next order, the system can consider the items for two orders in the aggregate and assign the picking cars and shuttles 500 for all the items for a plurality of orders (such as two or three) as though the items were for a single order and assign the cars accordingly. When the picking cars return with the items, the system may then prompt the operator as to which order the item is for, such as by providing an indicator on the display at the pick station.

Rather than returning an item to the storage location from which it was retrieved, the system may search for the open storage location in a row of the next item that the car is to retrieve. The car can then unload the item into the transfer location for the row and the shuttle can return the item to an open storage location in the row. The central controller then stores the location of the new storage location so that the items can be retrieved as necessary. In this way, the system can continuously re-assign the storage location of items in the SAR system 400 as the items are returned to storage locations. In order to improve the likelihood that an open storage location is proximate the next item to be retrieved, in the present instance, the array of storage is locations is assigned so that there are more storage locations than items to be stored. For instance, each row in each rack 410A, 410B may have one or more empty storage locations. However, the number of empty storage locations in a row may fluctuate as items are retrieved and returned.

The SAR system 400 may be modular so that the SAR system can be expanded as necessary by attaching an additional section to the left side of rack 410A or the right side of rack 410B. A second set of shuttles can then be operated between rack 410A or 410B and the new rack. Additionally, another picking system 100 can be provided so that the second picking system transfers items between rack 410A or 410B and the new rack.

Additionally, the system can be expanded by adding additional picking systems 100. For instance, in the system 10 described above, a single pick system 100 was provided at an end of the SAR system 400. A second picking station can be added to the opposite end of the SAR system 400 so that the second picking station aligns with the aisle between the racks 410A, 410B. In this way, items can be retrieved by the shuttles and driven to a first end of the row to transfer the item to the first picking system or the shuttle can be driven to the opposite end of the row so that the item can be transferred to the second picking system. Further still if a second picking station is added to that items can be transferred to a picking system at either end of each row, the number of shuttles can be increased so that two shuttles operate along each row: a first shuttle in a row conveys items toward the first picking system and a second shuttle in the row conveys items toward the second picking system. Each shuttle in each row are independently operable, although if a plurality of shuttles is provided in the rows, the central controller controls the operation of the shuttles to ensure that two shuttles do not collide.

Further, although the foregoing describes the SAR system as an array of storage locations in a two-dimensional array in which the SAR shuttles 500 travel back and forth in a horizontal direction in X and Y directions, as mentioned previously, the SAR system 400 may be configured in a number of different configurations. For example, the SAR system 400 may include a track that extends horizontally and or vertically to allow a plurality of SAR vehicles to retrieve items from a three-dimensional array of storage locations. In such a system, the vehicles move along a track and retrieve items and then are driven to one of a plurality of transfer locations. One or more picking stations positioned around the three-dimensional array of storage locations retrieve the items from the transfer locations and drive the items to a picking station as described above.

It will be recognized by those skilled in the art that changes or modifications may be made to the above-described embodiments without departing from the broad inventive concepts of the invention. For instance, in the above description, the system uses a wireless communication between the cars and the central controller. In an alternative embodiment, a communication line may be installed on the track and the cars may communicate with the central controller over a hard-wired communication link.

Storing Items

An input station 360 can be provided for storing new items in the system or for re-stocking the storage locations as the item are used to fill orders. A variety of mechanisms can be used to stock items into the system 10. However, in the present instance, an input station 360 in the form of a conveyor or roller bed may be incorporated into the picking system 100. The input system 360 is illustrated in FIGS. 1, 4 and 5.

The input station 360 is positioned along the picking track 110. The input station may include a mechanism for loading new items onto the picking vehicles and a mechanism for discharging empty totes from the picking vehicles. For instance, as shown in FIG. 5, the input station includes an input conveyor 360A adjacent the rear track 120 and an output conveyor 360B adjacent the forward track 115. Each of the conveyors 360A, 360B is operable to drive items toward or away from picking vehicles 200 on the picking track 110. For instance, each conveyor 360A, 360B may comprises a plurality of elongated cylindrical parallel rollers forming a roller bed. A drive mechanism, such as a friction belt selectively drives the rollers in response to signals received from the central controller. In this way, when a tote 15 is empty or needs replenishment, the picking vehicle may be driven to the input station where the tote is discharged from the picking vehicle and a new tote is transferred onto the picking vehicle.

In order to re-stock items or load new items into the system, the items may be loaded into totes and then the totes are transported to the input station 360. For example, a series of conveyors or other transfer devices may cooperate to drive a supply of totes having items to be stored in the SAR system 400. The central controller tracks each tote as it is conveyed to the input station, so that the system knows which items are in which tote. In this way, when the totes are subsequently stored in the SAR system 400, the system knows which totes are stored at which storage location and which items are in which totes.

The central controller controls the operation of the picking vehicles and the input station 360 to automatically insert totes containing items into the flow of totes, thereby re-stocking the system or adding new items to the system. For instance, since the central controller 350 tracks the items in each tote, the central controller knows when a tote is empty or has few enough items that the tote should be re-stocked. Similarly, if an item stored in tote becomes outdated, the system may determine that the tote should be discharged from the system to discard the old items.

When the central controller determines that a tote should be discharged from the system because it is empty, the items in it are outdated or otherwise, the picking vehicle carrying the tote is directed toward the input station 360. At the input station, the tote is discharged from the picking vehicle. For instance, the conveyor on the picking vehicle may be activated thereby driving the tote onto the discharge conveyor. By way of example, referring to FIG. 5, the picking vehicle 200F is conveyed to the input station. The conveyor of the picking vehicle 200F and discharge conveyor are then actuated. The conveyor on the picking vehicle drives the tote 15F off from the picking vehicle and the discharge conveyor drives the tote 15F along the discharge conveyor, away from the picking vehicle. At the same time tote 15F is being discharged from the picking vehicle, a new tote comprising items may be loaded onto the picking vehicle 200F, similar to the manner in which totes are concurrently discharged and picked up at the transfer locations 375, as discussed above.

In the foregoing description, the system is re-stocked at the input station be loading totes containing items onto the picking vehicles, which then drive to one of the transfer locations and transfer the new totes to the SAR system as described above. Additionally, it should be understood that rather than re-stocking items by inserting new totes into the system, the totes may be re-stocked by inserting items into the totes on the picking vehicles. For instance, an empty tote or a tote having an empty compartment may be conveyed to the input station just as the totes are conveyed to the picking station. At the input station, rather than picking an item from the tote, an operator (human or mechanical) places items into the tote. The picking vehicle then conveys the tote to one of the transfer locations and the tote is stored in the SAR system 400 in the same manner as described above. The input station may interface with a conveyor or other mechanism from outside the track 110, for loading items into the input area.

Further still, rather than re-stocking the system by loading items into totes, the items may be stored and retrieved in separate containers, such as cardboard cartons, or the items may be stored directly without being contained in a container. In such instances, rather than being inserted into totes, the items or containers are loaded directly onto the picking vehicles to re-stock the items.

The input station communicates with and may be controlled by the central controller 350. For instance, the input station may include a scanner or other input mechanism for scanning an identification item, such as a bar code on the new items to be stored in the system. Alternatively, an operator may identify the items at the input station and input identifying information into the system via an operator interface, such as a keyboard or touch screen. In this way, the system may automatically identify new stock items or an operator may input information into the system manually or a combination of automatic and manual data entry may be used.

In the foregoing description, the system is described as having a single input station. However, it may be desirable to incorporate a plurality of input stations positioned along the system 10. By using a plurality of input stations, the feed rate of re-stocking items or adding new items may be increased. In addition, the input stations may be configured to process different types of items. In this way, each input station could be configured to efficiently process a particular category of items.

Furthermore, rather than including separate input stations, the picking station(s) 310 can be used as input stations to store new items or re-stock the items. Further still, the picking system can be configured as a re-stocking system rather than as a picking and re-stocking system. Specifically, the picking station 310 may be eliminated from the picking track 110 and the system may use one or more input stations 360 to re-stock the SAR system 400 or to load new items into the SAR system. Further still, the input station 360 can operate as picking stations as well as input stations. To fulfill an order, a tote may be discharged from the picking vehicle. The tote can then be conveyed to a location where an item is picked from the tote. Alternatively, in arrangements in which the items are transferred directly rather than being stored in totes, the items are picked by discharging the items from the delivery vehicle.

It should therefore be understood that this invention is not limited to the particular embodiments described herein, but is intended to include all changes and modifications that are within the scope and spirit of the invention as set forth in the claims.

The invention claimed is:

1. A method for processing a plurality of items with a material handling system having a plurality of destination areas and a plurality of independently operable delivery vehicles, wherein the method comprises the steps of:
    loading an item onto one of the delivery vehicles, wherein the step of loading an item comprises the steps of:
        stopping the delivery vehicle at an input station; and
        operating a transfer mechanism to load an item onto the delivery vehicle while the delivery vehicles is stopped at the input station;
    driving the delivery vehicle vertically and horizontally along a track to one of the destination areas after the item is loaded at the input station;
    transferring the item from the delivery vehicle to the destination area;
    accumulating a plurality of items at the destination areas by repeating the steps of loading, driving and transferring a plurality of times;
    controlling a plurality of independently operable retrieval vehicles to selectively retrieve items accumulated in the destination areas wherein the step of selectively retrieving items accumulated in the destination areas comprises operating a loading mechanism that is configured differently than the transfer mechanism; and
    displacing the retrieval vehicles to displace the selectively retrieved items away from the destination areas.

2. The method of claim 1 wherein the step of driving comprises maintaining the horizontal orientation of the delivery vehicle as the delivery vehicle drives from a vertical direction to a horizontal direction.

3. The method of claim 2 wherein the step of driving comprises driving the delivery vehicle around a loop having a vertical leg and a horizontal leg.

4. The method of claim 1 wherein the step of driving the delivery vehicle comprises driving the delivery vehicles vertically upwardly.

5. The method of claim 1 wherein each delivery vehicle comprises two pairs of opposing wheels and the track comprises a front track for guiding a first pair of the opposing wheels and rear track for guiding a second pair of the opposing wheels wherein an aisle is formed between the front track and the rear track, wherein the step of driving the delivery vehicle comprises driving the delivery vehicle within the aisle to deliver the item to the one destination area.

6. The method of claim 1 wherein the step of displacing the retrieval vehicles comprises displacing the retrieval vehicles away from the track.

7. The method of claim 6 wherein the step of displacing the retrieval vehicles comprises driving the retrieval vehicles along a route that is separate from the track.

8. The method of claim 7 wherein the track is a first track and the route comprises a second track that is separate from the first track.

9. The method of claim 1 wherein the step of operating a transfer mechanism comprises the step of actuating a transfer mechanism that forms part of the delivery vehicle.

10. The method of claim 9 wherein the transfer mechanism comprises a conveyor belt and the step of actuating a transfer mechanism comprises driving the conveyor belt to displace the item on the conveyor belt.

\* \* \* \* \*